(12) United States Patent
Sundararajan

(10) Patent No.: US 11,920,705 B2
(45) Date of Patent: Mar. 5, 2024

(54) SLIDING CONNECTOR SPOOL

(71) Applicant: SRI ENERGY, INC., Sugar Land, TX (US)

(72) Inventor: Alagarsamy Sundararajan, Sugarland, TX (US)

(73) Assignee: SRI ENERGY, INC., Sugar Land, TX (US)

( * ) Notice: Subject to any disclaimer, the term of this patent is extended or adjusted under 35 U.S.C. 154(b) by 0 days.

(21) Appl. No.: 18/307,903

(22) Filed: Apr. 27, 2023

(65) Prior Publication Data

US 2023/0349494 A1 Nov. 2, 2023

Related U.S. Application Data

(60) Provisional application No. 63/335,262, filed on Apr. 27, 2022.

(51) Int. Cl.
*F16L 23/024* (2006.01)
*E21B 34/02* (2006.01)
(Continued)

(52) U.S. Cl.
CPC .......... *F16L 23/024* (2013.01); *E21B 34/025* (2020.05); *F16L 19/005* (2013.01); *F16L 19/025* (2013.01); *F16L 23/0286* (2013.01)

(58) Field of Classification Search
CPC . F16L 23/024; F16L 23/0286; F16L 23/0283; F16L 23/02; F16L 27/1012;
(Continued)

(56) References Cited

U.S. PATENT DOCUMENTS

| 1,334,007 A | 3/1920 | White |
| 1,573,511 A | 2/1926 | Claude |

(Continued)

FOREIGN PATENT DOCUMENTS

| WO | 2008100059 A1 | 8/2008 |
| WO | 2009091725 A1 | 7/2009 |

(Continued)

OTHER PUBLICATIONS

"Seismic Pipe & Fittings", U.S. Pipe, retrieved from uspipe.com, 2020, 22 pages.

(Continued)

*Primary Examiner* — William S. Cho
(74) *Attorney, Agent, or Firm* — TROP, PRUNER & HU, P.C.

(57) ABSTRACT

An embodiment includes a spool that may expand and contract to ease removal and addition of components to an oilfield manifold. The spool may comprise: a first conduit to couple to a first flange via a first ring joint gasket; a second conduit to couple to a second flange via a second ring joint gasket, the second conduit including threads; a third conduit coupled to the first and second conduits; and a fourth conduit including threads, the threads of the fourth conduit directly engaging the threads of the second conduit. The first, second, and third conduits collectively form a channel that couples first and second opposing ends of the spool to one another and which includes a long axis. Rotating the fourth conduit about the long axis moves the second conduit linearly along the long axis.

25 Claims, 16 Drawing Sheets

(51) Int. Cl.
*F16L 19/00* (2006.01)
*F16L 19/025* (2006.01)
*F16L 23/028* (2006.01)

(58) Field of Classification Search
CPC ....... F16L 27/127; F16L 25/12; F16L 19/005;
F16L 19/0231; F16L 19/02; F16L 19/025;
E21B 34/025; E21B 33/068; E21B 33/04;
E21B 17/02
See application file for complete search history.

(56) References Cited

U.S. PATENT DOCUMENTS

| | | | |
|---|---|---|---|
| 2,448,232 A | 8/1948 | Muse | |
| 3,427,051 A | 2/1969 | White et al. | |
| 3,647,245 A | 3/1972 | Hanes et al. | |
| 3,664,690 A | 5/1972 | Williams et al. | |
| 3,807,777 A | 4/1974 | Larkin | |
| 3,889,985 A | 6/1975 | Gartmann | |
| 4,219,226 A | 8/1980 | Kappenhagen | |
| 4,570,673 A | 2/1986 | Kendrick et al. | |
| 4,603,887 A | 8/1986 | Mayfield et al. | |
| 4,659,114 A | 4/1987 | Gerber | |
| 4,720,124 A | 1/1988 | Taylor et al. | |
| 4,932,686 A | 6/1990 | Anderson, Jr. | |
| 5,404,912 A | 4/1995 | Hausler et al. | |
| 5,853,113 A | 12/1998 | Small et al. | |
| 6,471,249 B1 | 10/2002 | Lewis | |
| 6,718,997 B2 | 4/2004 | Biszko | |
| 8,079,622 B2 | 12/2011 | Maier | |
| 8,157,006 B2 | 4/2012 | Koleilat et al. | |
| 8,857,863 B1 | 10/2014 | Patin et al. | |
| 9,267,615 B1 | 2/2016 | Corte, Jr. et al. | |
| 9,765,912 B2 | 9/2017 | Spears et al. | |
| 9,932,800 B2 | 4/2018 | Guidry | |
| 10,132,146 B2 | 11/2018 | Guidry | |
| 10,562,001 B2 | 2/2020 | Lattanzio et al. | |
| 10,801,294 B2 | 10/2020 | Jespersen et al. | |
| 10,975,654 B1 * | 4/2021 | Neacsu | |
| 10,995,561 B1 | 5/2021 | Travix et al. | |
| 11,105,175 B2 | 8/2021 | Chirko et al. | |
| 11,131,393 B2 | 9/2021 | Sundararajan | |
| 11,193,349 B1 | 12/2021 | Dille et al. | |
| 11,214,455 B2 | 1/2022 | McGuire et al. | |
| 11,333,030 B2 | 5/2022 | Guevel | |
| 11,428,053 B1 * | 8/2022 | Allen | |
| 11,454,100 B1 | 9/2022 | Choate | |
| 2003/0116314 A1 * | 6/2003 | Dallas | E21B 33/068 |
| 2006/0267342 A1 | 11/2006 | Boyd | |
| 2009/0261575 A1 | 10/2009 | Bull et al. | |
| 2013/0175039 A1 * | 7/2013 | Guidry | E21B 33/068 |
| 2018/0223621 A1 * | 8/2018 | McGuire | E21B 33/068 |
| 2021/0238006 A1 | 8/2021 | Moseley et al. | |
| 2021/0239241 A1 | 8/2021 | Mullins et al. | |
| 2021/0285580 A1 | 9/2021 | Travis | |
| 2021/0301953 A1 | 9/2021 | Crawford | |

FOREIGN PATENT DOCUMENTS

| | | |
|---|---|---|
| WO | 2015152729 A1 | 10/2015 |
| WO | 2018157270 A1 | 9/2018 |
| WO | 2019127591 A1 | 7/2019 |

OTHER PUBLICATIONS

"Rotating Swivel Spool", Heshka Oil, retrieved from heshkaoil.com, 2020, 4 pages.
"Adjustable-Length Pipe Couplings—vonRoll hydro", 2020, 13 pages.
Choi et al., "Expansion Spool Design of an Offshore Pipeline by the Slope Deflection Method", Journal of Ocean Engineering and Technology 24.5 (2010): 1-7.
Patent Cooperation Treaty, International Search Report and Written Opinion dated Aug. 25, 2023 in International Application No. PCT/US2023/020107 (10 pages).

* cited by examiner

Right Side View

Front View

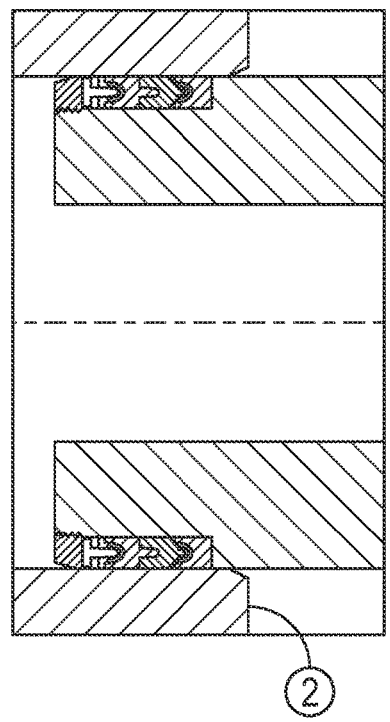
FIG. 14
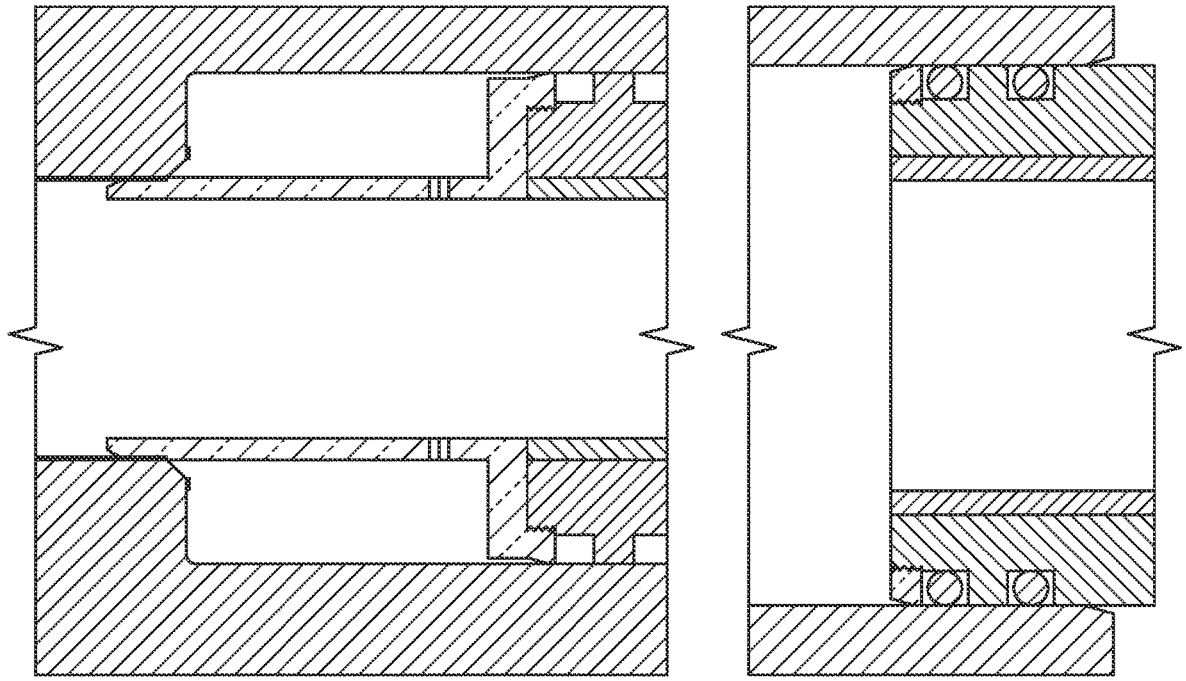
FIG. 15A
FIG. 15B

SLIDING CONNECTOR SPOOL

CROSS-REFERENCE TO RELATED APPLICATION

This application claims priority to U.S. Provisional Patent Application No. 63/335,262 filed on Apr. 27, 2022 and entitled "Sliding Connector Spool for Oilfield Manifolds", the content of which is hereby incorporated by reference.

TECHNICAL FIELD

Embodiments of the invention are in the field of oilfield equipment.

BACKGROUND

In oilfield environments, many components are often connected to one another to direct flow of various fluids. For example, FIGS. 1A and 1B collectively depict a collection of conduits (e.g., pipes), valves (e.g., gate valves) 101, and chokes 102 that may be coupled together in a manifold system. A "spacer spool" may space two different components from each other. For example, spool 103 connects choke 102' to valve 101'. Often the fluids traversing this collection of equipment are caustic and/or laden with debris, either of which may necessitate the servicing of any one or more of the constituent parts of the manifold system.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIGS. 11-14 address various seal configurations to be used in embodiments.

FIGS. 15A and 15B address wear sleeve embodiments.

DETAILED DESCRIPTION

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments (e.g., walls may not be exactly orthogonal to one another in actual fabricated devices). Moreover, the drawings may only show the structures useful to understand the illustrated embodiments. Additional structures known in the art may not have been included to maintain the clarity of the drawings. For example, not every layer of a device is necessarily shown. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Phrases such as "comprising at least one of A or B" include situations with A, B, or A and B.

Figure 1B:
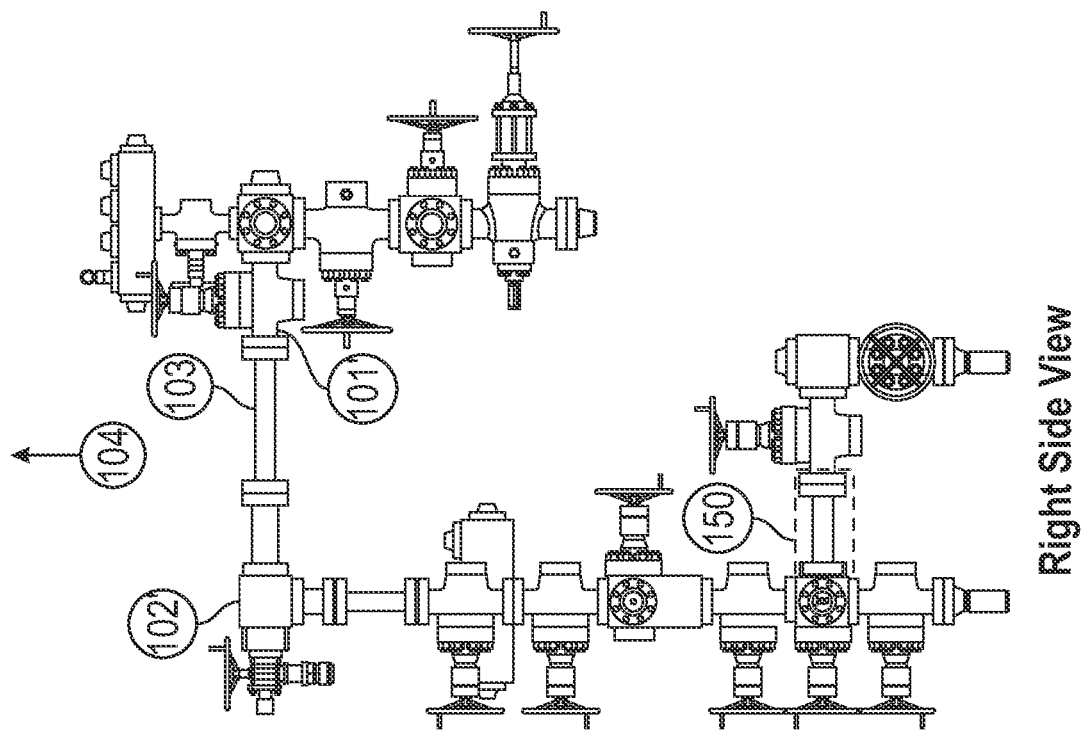
FIGS. 1A and 1B provide front and side views of manifold systems.
Figure 1A:
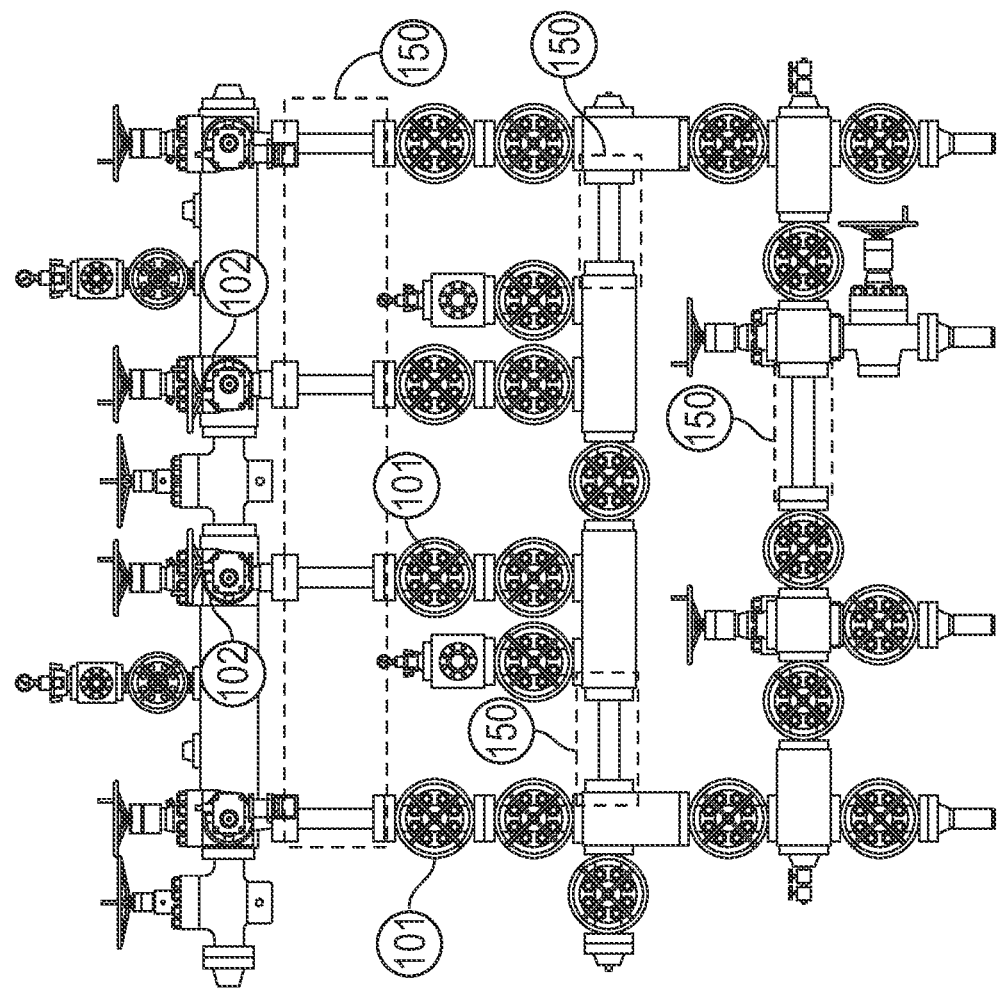
Figure 16A:
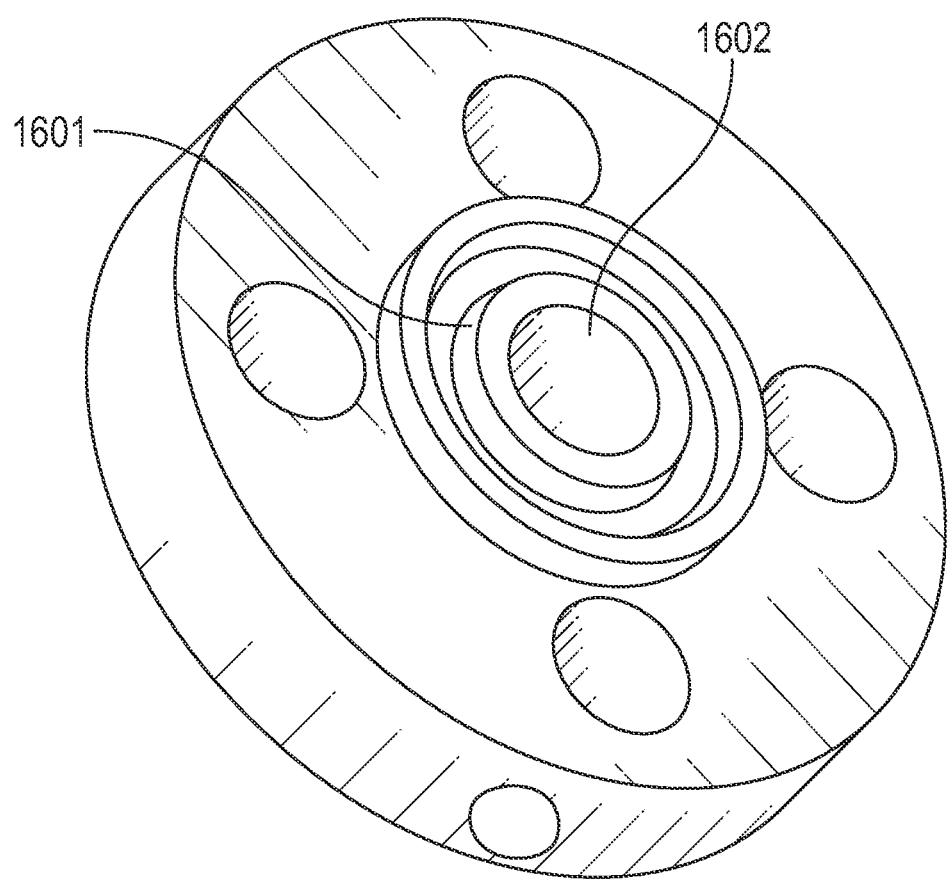
FIGS. 16A and 16B and 17 address ring grooves.
Figure 16B:
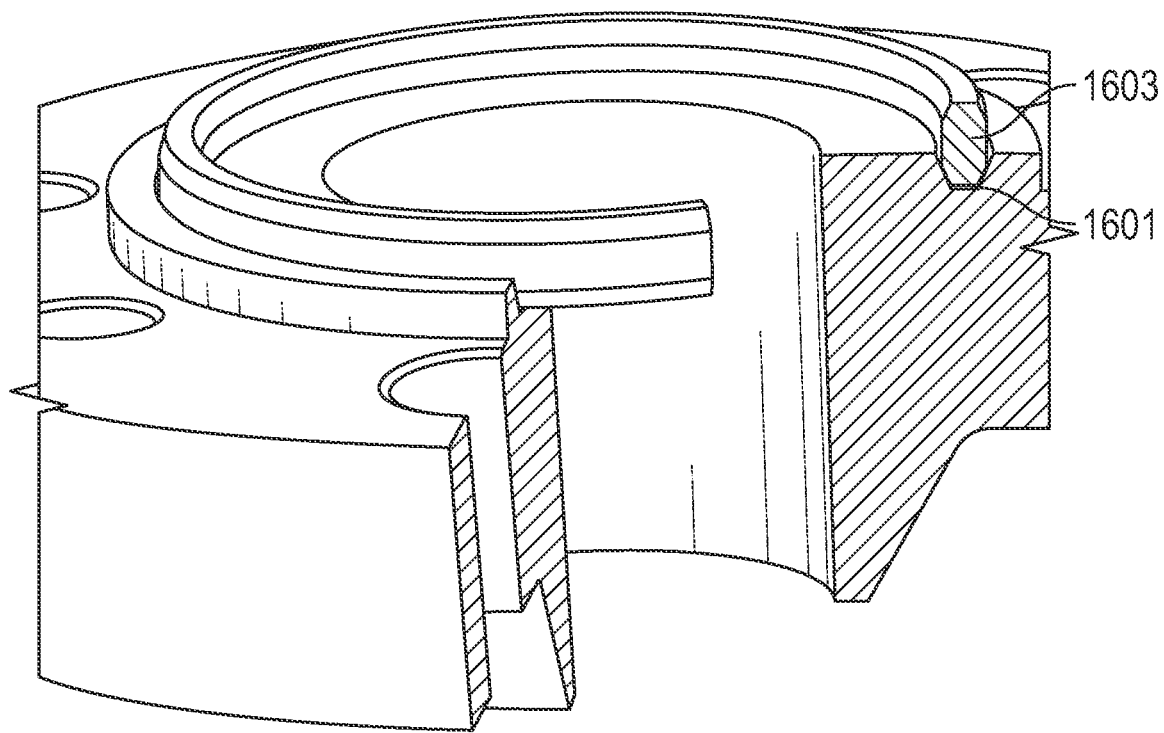
Figure 17:
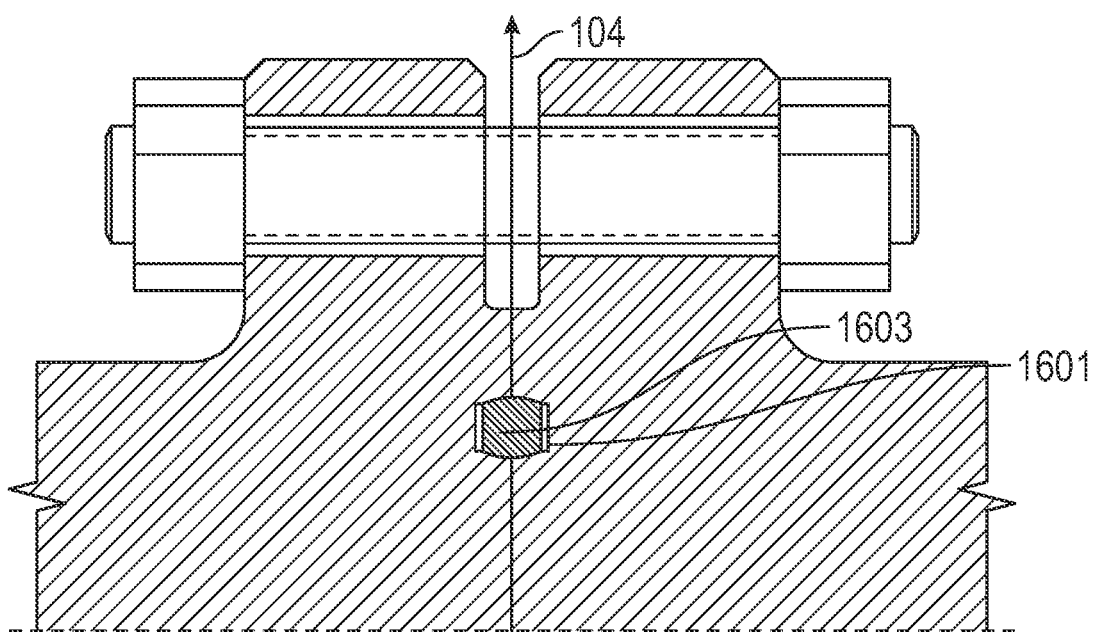

Applicant identified a problem with the manifold system, such as the right-angle manifold assembly/system of FIG. 1A. Specifically, Applicant noted the complexity involved with a task such as removing a choke (or other piece of equipment) for servicing of the choke (or other piece of equipment) and/or adding a choke (or other piece of equipment) into the assembly. To do so, a great deal of the rigid manifold system must be disassembled in order to remove a piece of equipment, such as choke 102'. This is the case which choke 102' because spacer spool 103 is rigid and cannot be simply removed in direction 104 thereby granting access to choke 102'. Spacer spool 103 cannot be removed because it couples to choke 102' and valve 101' via obstructive members such as, for example, ring grooves. FIG. 16A shows how a flange including ring groove 1601 would prevent a device, such as a spool including a rigid component seated within groove 1601, from being slid away from the flange in a direction orthogonal to an axis traversing channel 1602. FIG. 16B shows a ring joint gasket, which includes ring 1603 located within ring groove 1601. Rigid spools having these types of ring groove-based joints (or interfacing such joints) need to be torqued together with the spool's associated component's flange (e.g., the flange of elements 101' or 102') with zero gap for positive sealing. See, for example, how in FIG. 17 ring 1603 within ring groove 1601 (both of which form a ring joint gasket) prevents movement of device pieces along or parallel to direction 104. Failure to do so will result in leak or potential damage of associated components.

Figure 2A:
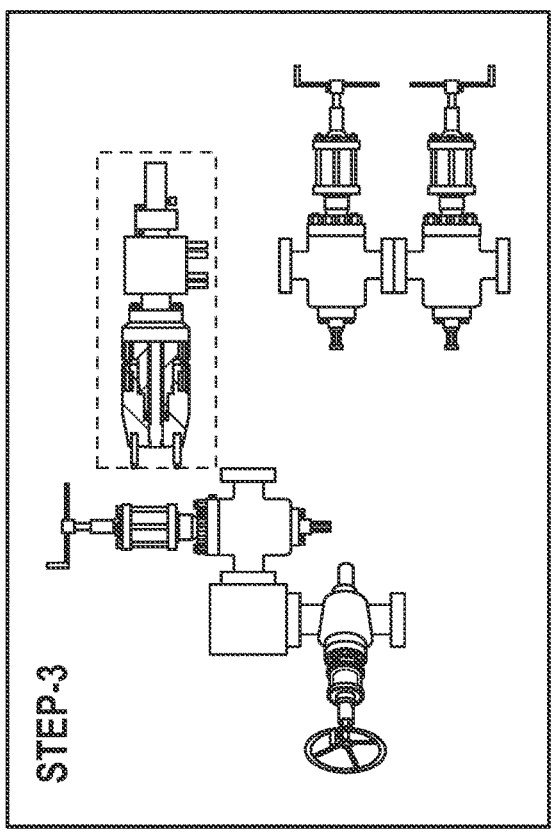
FIGS. 2A, 2B, 2C depict a process for operating a sliding spool in an embodiment.
Figure 2B:
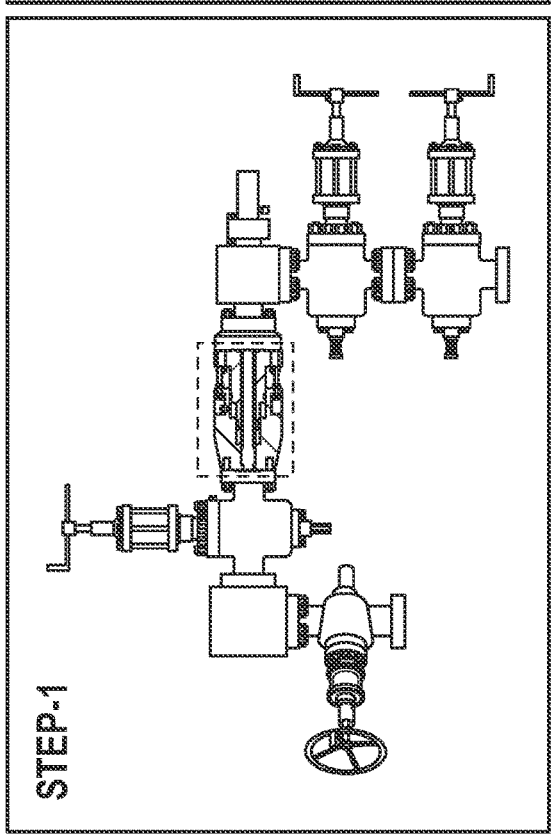
Figure 2C:
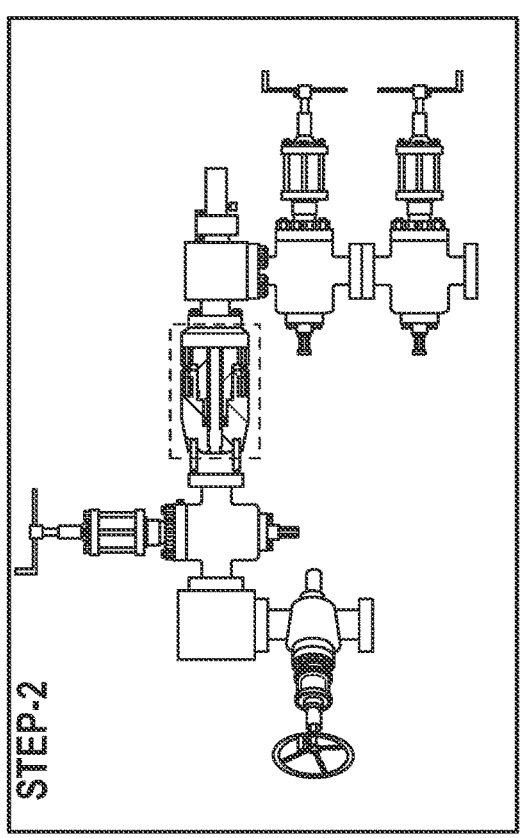
Figure 3:
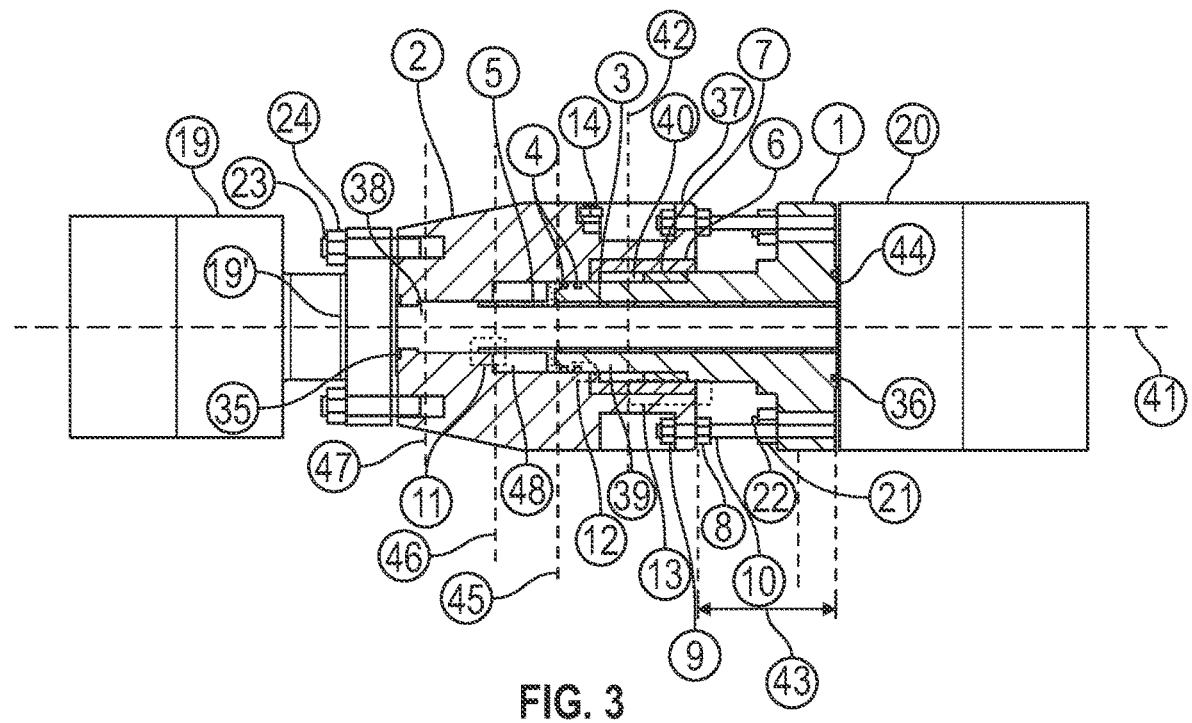
FIG. 3 depicts an embodiment of a sliding spool.

However, FIG. 3 provides a slidable spool that addresses the above problem. The sliding spool has an adjustable or sliding end connection that uses adjustable nuts with studs and different internally guided parts. This enables the operator to assemble or dis-assemble the spool on manifold assemblies independently and without interfering with associated components. See FIGS. 2A, 2B, 2C for a process of collapsing a spool in order to remove the spool. As a result (and as compared to rigid spools), sliding spool embodiments addressed herein save time and money and provide for error-free assembly.

In FIG. 3, slidable spool 1 connects to spool housing 2 by means of guide element 6 (e.g., bearing housing) and element 7 (e.g., linear bearing). Seal 4 acts as a pressure barrier between slidable spool 1 and spool housing 2. Element 3 (e.g., wear sleeve) is within spool 1 and prevents wear to the spool from fluid traversing channel 38. Element 5 (e.g., sleeve attachment) connects to spool 1 via a threaded or locked connection and prevents wear to the spool 1 and/or housing 2 from the fluid traversing channel 38. Element 6 (e.g., bearing housing) and element 7 (e.g., linear bearing) collectively guide the spool along the spool housing and lower friction caused by the moment load, which is present between the spool and spool housing during assembly and/or disassembly of the spool system and during operation of the spool system. Elements 8 and 9 (engaging and disengaging nuts) and element 10 (e.g., connector stud) collectively combine to slide spool housing 2 back and forth over spool 1. Element 14 (e.g., autoclave relief plug) is a safety feature to protect elements 6 and/or 7 from wellbore fluid pressure. In an assembled system, spool 1 is connected to: (a) flanged end connector 20 by elements 21, 22, and (b) bolted connector 19 by elements 23, 24. However, other embodiments may use a bolted end connector instead of a flanged end connector (which still uses a ring gasket between the connections).

The following addresses removing the sliding spool from the manifold system (see FIGS. 2 and 3). When spool 1 is engaged and connected with end connector 19, nuts 24 are unthreaded so spool housing 2 is no longer fixed to end connector 19. Then engaging nuts 8 are threaded towards end 44. Afterwards, disengaging nuts 9 are evenly tightened to push and slide spool housing 2 towards spool 1 end flange face 44 until stud 23 clears the flange face of connector 19. The whole sliding spool system can then be removed. During this operation linear bearing 7 bears the friction and self-load from bearing housing 6 and spool housing 2.

The following addresses attaching the sliding spool to the manifold system. When spool 1 is engaged and connected with flanged connector 20, disengaging nuts 9 may be unthreaded away from end 44. Then nuts 8 are evenly manipulated to push and slide spool housing 2 away from end 44 until spool housing 2 touches the flange face 19' of element 19. Nut 24 is threaded and spool housing 2 is connected to bolted connector 19. Nuts 8 are manipulated with torque to finish assembling the assembly. As a result, the whole sliding spool system is considered installed. During this operation linear bearing 7 bears the friction and self-load from bearing housing 6 and spool housing 2. Embodiments are varied and some may include features not found in FIG. 3 or may remove features found in FIG. 3. For example, some embodiments may connect to the spool via only bolted connectors, only flanged connectors, or other connectors beyond bolted or flanged connectors such as connectors 19, 20.

Now various functional feature types are discussed.

Regarding spool housing 2 and the spool entrance, whenever spool 1 enters spool housing 2, area 13 (spool entering segment) enters first and guides spool 1 towards area 12 (a guide entering segment which includes a guided seal) and area 11 (nose entering segment) so spool 1 is engaged with spool housing 2 without damaging seals 4 in area 12.

Regarding a guided bearing setup, linear bearing 7 is connected (e.g., press fit or threaded fit or secured via a retainer ring) to spool 1. Bearing housing 6 is connected (e.g., press fit or threaded fit or secured via a retainer ring) to spool housing 2. Spool 1 enters spool housing 2. This causes linear bearing 7 to slide (while loaded) along bearing housing 6. This happens during both attaching and detaching the sliding spool to and from end connector 19.

Figure 4:
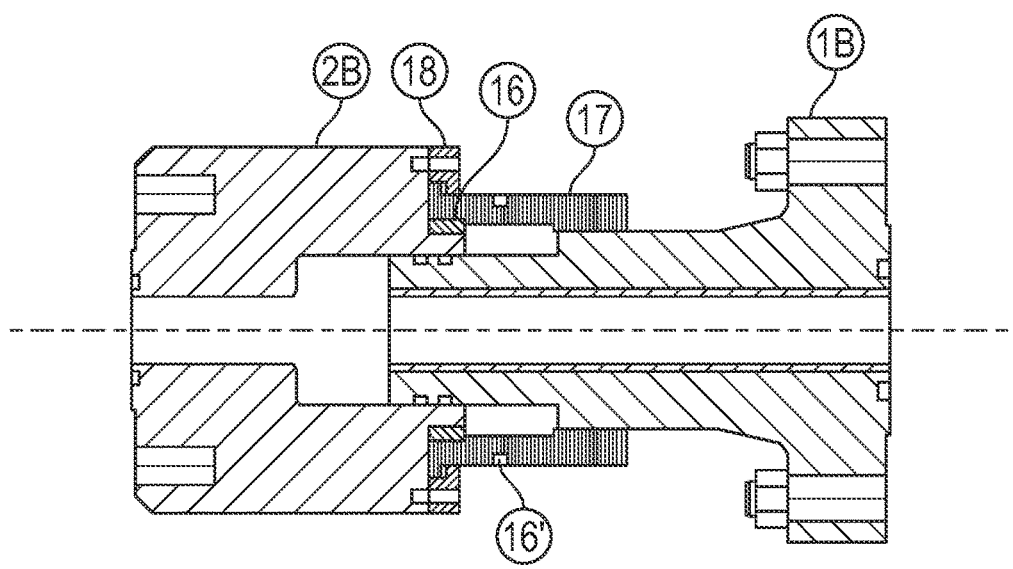
FIGS. 4 and 5 depict cross-section and perspective views of an embodiment of a sliding spool.
Figure 5:
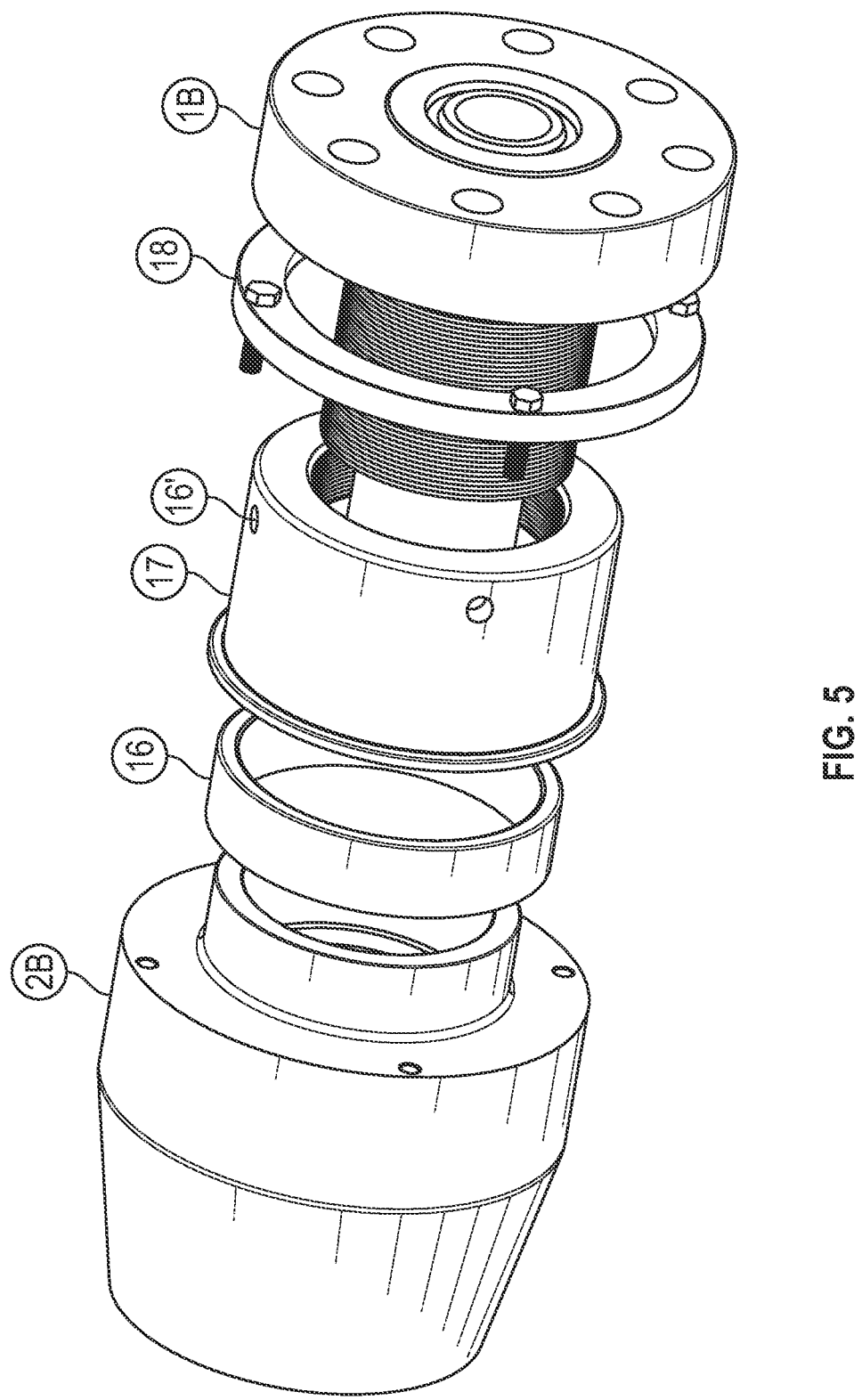

FIGS. 4 and 5 address a thread and collar type embodiment. Bearing 16 is connected (e.g., press fit or threaded fit or secured via a retainer ring) to spool housing 2B. Threaded collar 17 is connected (e.g., press fit or threaded fit or secured via a retainer ring) to bearing 16 and is further connected (e.g., threaded fit) to spool 1B. Collar retainer 18 couples (via bolts) collar 17 to spool housing 2B. Collar 17 includes a location 16' where eye bolts (or any type of bolts or lever or handle) can be connected, which acts as handle with which to rotate threaded collar 17. When spool 1B is engaged at a starting thread of collar 17, collar 17 is rotated to move spool 1B towards spool housing 2B. Similarly, collar 17 is rotated in the opposite direction to move spool 1B away from spool housing 2B. This happens during the processes of both attaching and detaching a sliding spool to an end connector.

Figure 6:
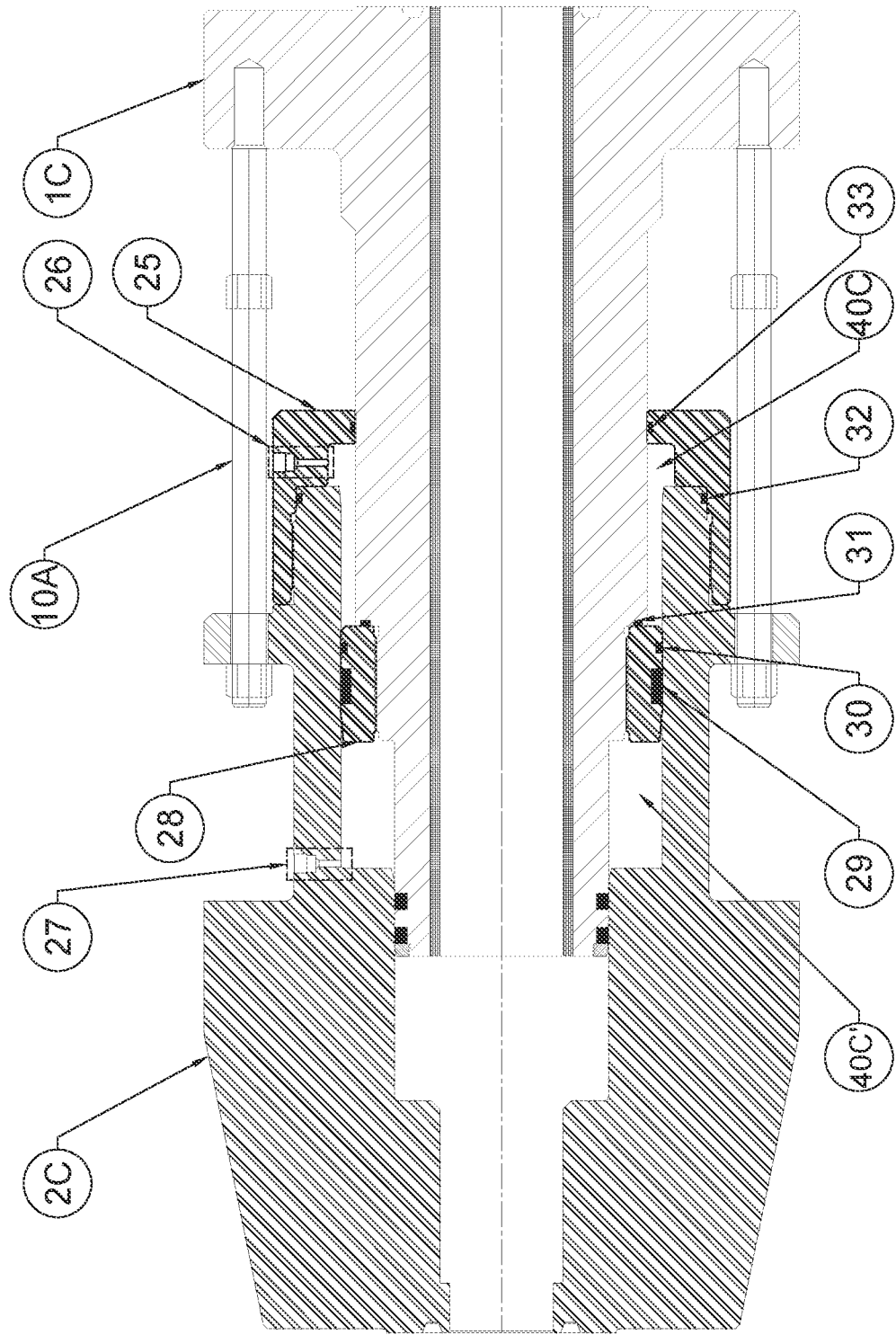
FIG. 6 depicts an embodiment of a sliding spool.

FIG. 6 addresses a hydraulic actuated system. Spool 1C is to couple to a first flange (not shown) via a first ring joint gasket (spaces for receiving the gasket are shown on the right end of element 1C). For clarity and brevity, certain features in FIG. 3 that are analogous to features in FIG. 6, such as ring joint gasket 36, are labeled on FIG. 3 but not FIG. 6. The spool 1C includes a spool projection. Spool housing 2C is to couple to a second flange (not shown) via a second ring joint gasket (spaces for receiving the gasket are shown on the left end of element 2C), the spool housing including a third flange and a spool housing channel. First and second studs 10A each: (a) contact the spool, and (b) traverse the third flange to couple the spool to the spool housing. The system comprises: (a) first and second nuts that are coupled to the first stud and that are on opposing sides of the third flange from one another; and (b) third and fourth nuts that are coupled to the second stud and that are on opposing sides of the third flange from one another. The spool projection is slidingly engaged within the spool housing channel.

The system comprises a first annular void 40C. The spool housing channel includes a first axis. A second axis, orthogonal to the first axis, intersects the first annular void, the spool projection, and spool housing 2C.

The spool has a spool end 44 to abut the first flange. In a first orientation (as shown in FIG. 6 with the spool in an expanded state) the first annual void has a first volume and the third flange is a first distance from the spool end. In a second orientation (not shown but with the spool in a collapsed state) the first annual void has a second volume and the third flange is a second distance from the second flange. The first volume is less than the second volume and the first distance is less than the second distance.

While in FIG. 3 screwing the first, second, third, and fourth nuts (which are on bolts 10A) towards the spool end transitions the system from the first orientation to the second orientation, the embodiment of FIG. 6 is slightly different. In FIG. 6 only nuts blocking the slide of the third flange along the stud 10A need to be loosened. However, the remaining nuts need not be manipulated to slide the spool. Instead, hydraulic power may be employed to the same effect. Namely, the system includes hydraulic lock collar 25, hydraulic port (engaging) 26, hydraulic port (disengaging) 27, and hydraulic piston 28. In contrast to FIG. 3, in FIG. 6 ports 26, 27 may be manipulated to slide the spool in either direction (to maximize the spool size or to minimize the spool size) instead of relying on power created by manipulating a nut to actually push the spool in either direction. In FIG. 6, the nuts that are furthest to the right on bolts 10A may service to limit the distance the spool 1C slides.

The system further comprises piston wear ring 29, piston seal 30, seal (spool face) 31, seal (hydraulic collar & spool housing) 32, and seal (hydraulic collar and spool) 33.

The system comprises a seal directly contacting the spool housing and the spool projection, wherein the seal is sliding engaged with a first of the spool housing or spool projection but not a second of the spool housing or spool projection. For example, in FIG. 6 the seal is statically located in a groove of the spool projection and slides along an inner wall of the spool housing.

Figure 7:
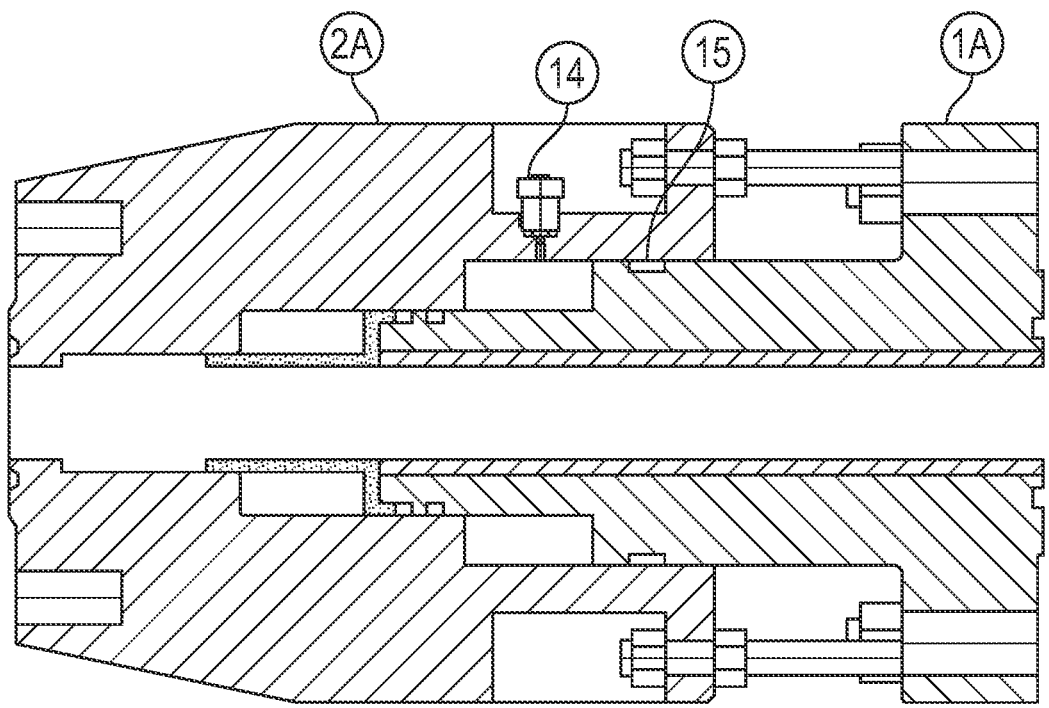
FIG. 7 addresses an embodiment that uses a nut type retraction mechanism.

FIG. 7 addresses an embodiment that uses a nut type retraction mechanism. FIG. 7 is similar to FIG. 3 but, in the least, differs from by FIG. 3 because elements 6, 7 are omitted and replaced with wear ring 15. Thus, when spool 1A is engaged and connected with an end connector, nut 24 (see FIG. 3) is unthreaded and spool housing 2A is disconnected from end connector 19 (see FIG. 3). Then engaging nuts 8 (see FIG. 3) are threaded all the way back and disengaging nuts 9 (see FIG. 3) are evenly tightened or manipulated to push and slide spool housing 2 towards the spool's end flange face. This occurs until stud 23 (see FIG. 3) clears the flange face. Afterwards, the sliding spool system may be removed.

When spool 1 is engaged and connected with flanged connector 20 (see FIG. 3), then disengaging nuts 9 (see FIG. 3) may be unthreaded/loosened. Then engaging nuts 8 (see FIG. 3) are evenly tightened to push and slide item spool housing 2 away from the spool's end flange face (away from element 20) until spool housing 2 touches a flange face for element 19. Nut 24 is threaded/tightened, and spool housing 2 is connected to bolted connector 19. Disengaging nuts 9 are tightened with torque to finish the assembly. Wear ring 15 acts as a guide and surface protection during the sliding operation.

Figure 8:
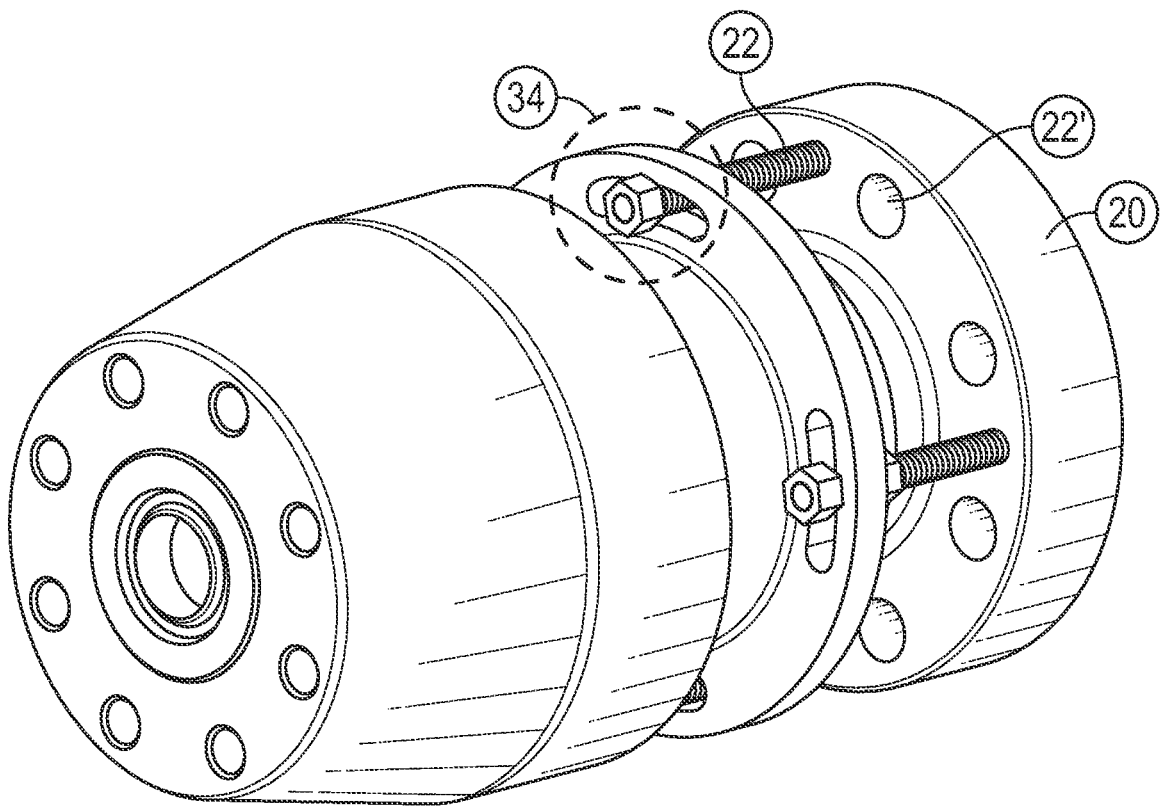
FIG. 8 concerns an embodiment that addresses flange hole misalignment.

FIG. 8 concerns flange hole misalignment. In conventional systems, spool 1 may not properly align its studs to circular apertures spaced about a flanged connector, such as connector 20. This is a very real scenario considering right-angle manifold systems such as the manifold shown in FIG. 1. However, the embodiment of FIG. 8 addresses the issue by using radial slots 34, which allow spool 1 to rotate within spool housing 2 until there is alignment between stud 22 and aperture 22' of flange 20. This misalignment management feature may be employed in various locations such as locations 150.

Figure 9:
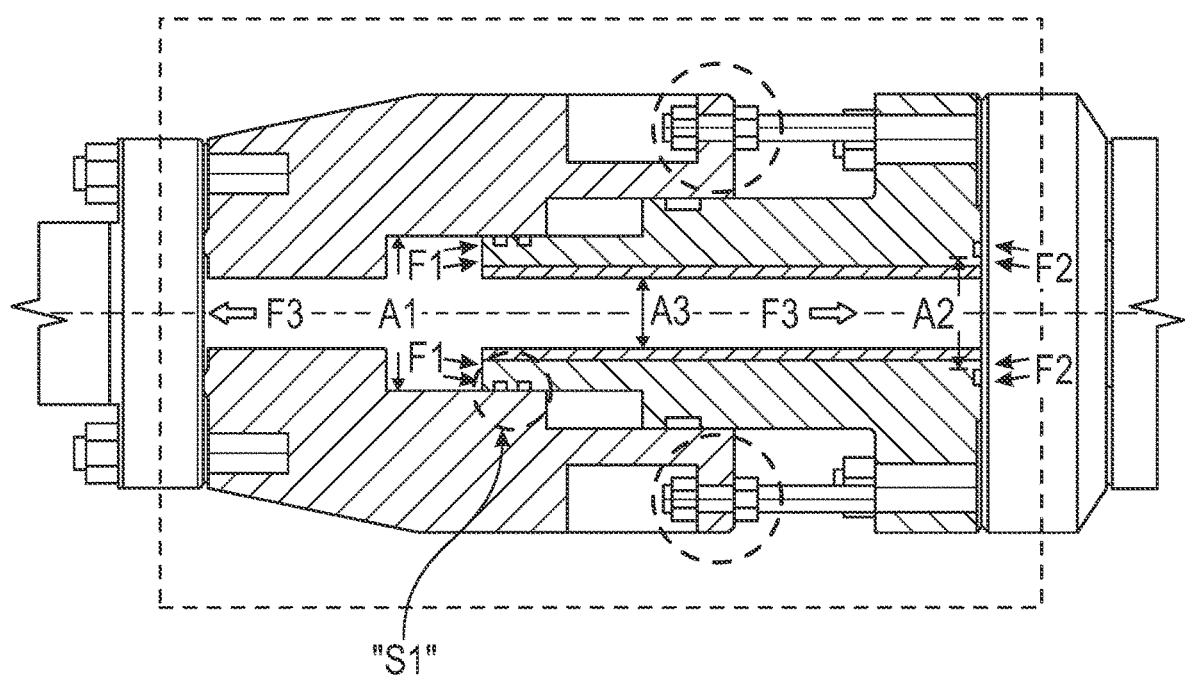
FIG. 9 addresses force distribution in an embodiment.
Figure 10:
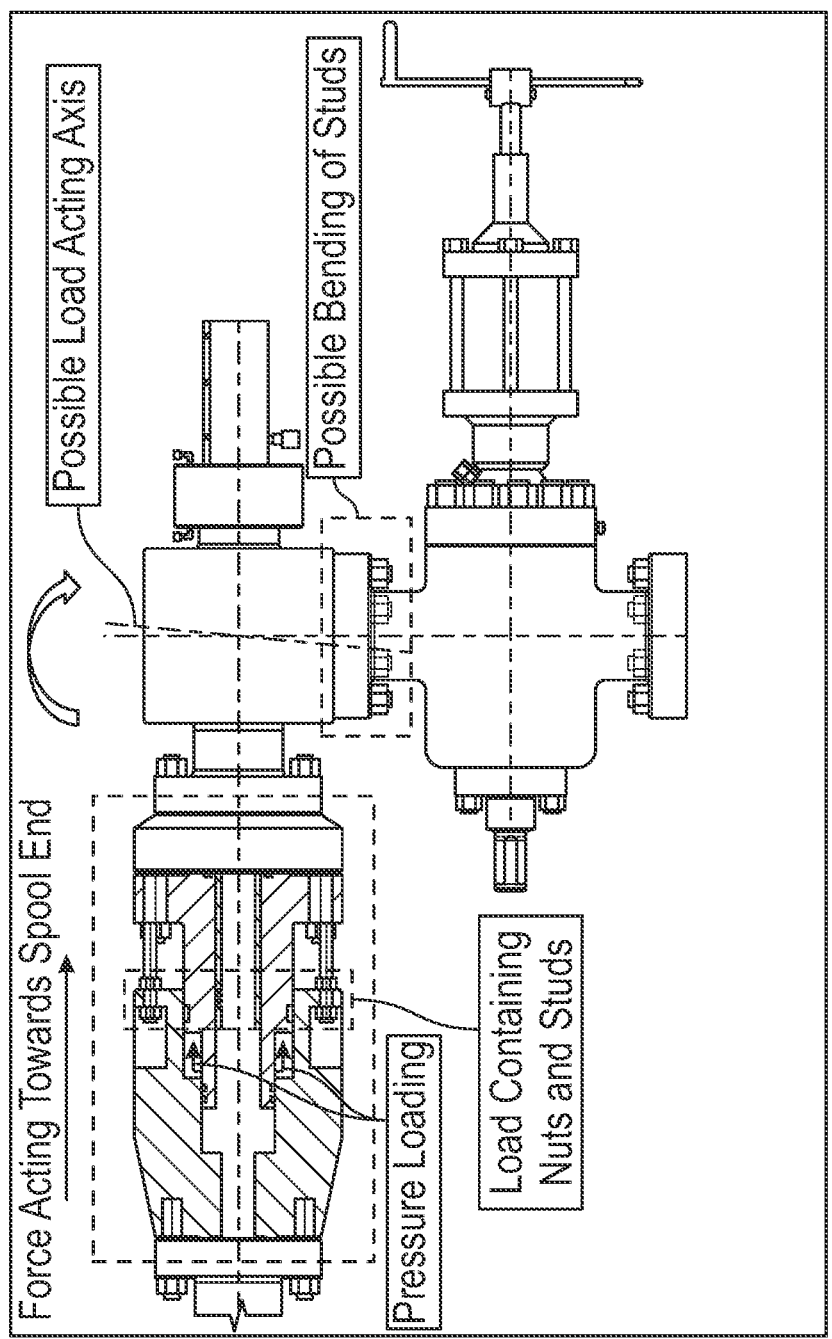
FIG. 10 addresses force distribution in an embodiment.

FIG. 9 provides an embodiment with similar structures to embodiments addressed above. For example, the embodiment of FIG. 9 includes parts analogous to, in the least, parts 1-4, 8-10, 19-24, 35, 37-40 of FIG. 3. FIG. 9 addresses how embodiments utilize bolt/stud assemblies to manage separation forces that are present while high pressure fluid traverses channel 38. "F3" corresponds to the pressure within bore A3 and "F2" is the force acting on ring joint diameter A2. FIG. 10 also addresses forces on various embodiments but focuses more on bending moments that are counteracted by bolt/stud assemblies such as the assembly of elements 8, 9, 10.

Figure 11:
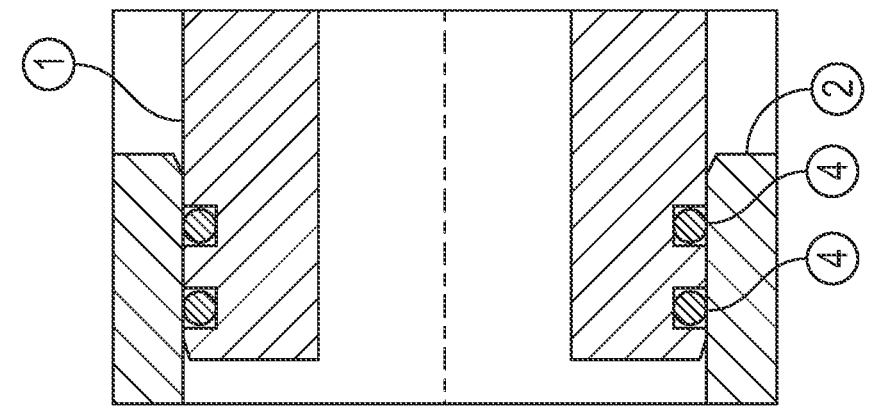
Figure 12:
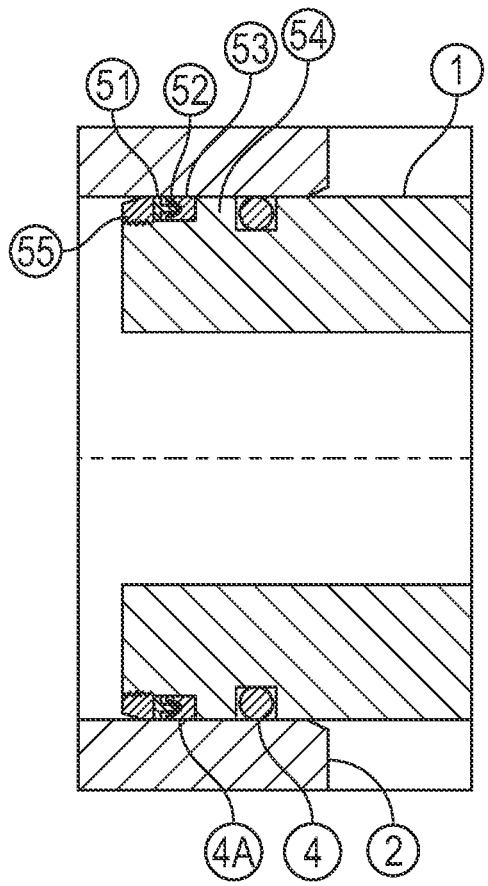
Figure 13:
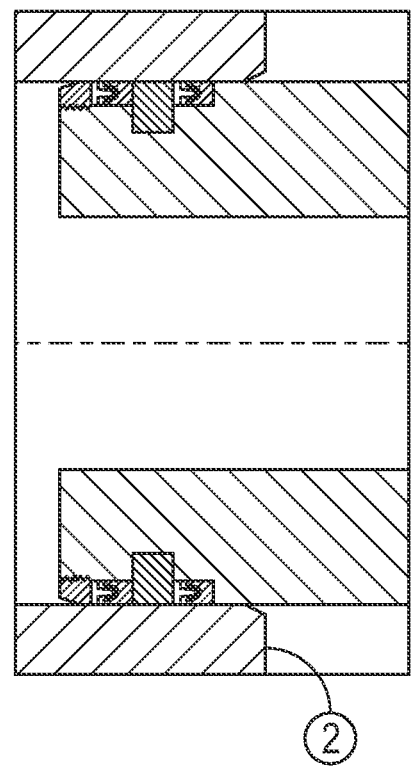

FIGS. 11-14 address various seal configurations to be used in embodiments addressed herein. The seals seal the interface between spool 1 and spool housing 2. FIG. 11 provides multiple O-rings. FIG. 12 provides an O-ring in combination with a spring energized seal assembly. The seal includes hat ring 51 which, when applied with pressure, stabilizes a spring/resilient member 52 that exerts force outwardly towards spool 1 and spool housing 2. In other words, the spring is energized by the clearance between the spool and spool housing, meaning when installed, the spring is compressed and is actively pushing outward against the compression. This forces the seal casing 53 against both the spool and the spool housing. When pressure enters the concave spring 52 it causes the spring to flare further outwards forcing the seal casing 53 against the sides of both the spool and spool housing (or any other two adjacent pieces such as piston 28 and seal housing 2C of FIG. 6). This seal works with pressure applied to the concave side of the spring (to the left of the seal in FIG. 12). Spacer 54 may be monolithic and used to prevent element 53 from being pushed into the adjacent O-ring. However, in other embodiments element 54 may be a ring. In some embodiments, the ring may be seated within a trough or channel and the ring may be formed from various elements. For example, the ring may include 2 pieces that are each half-circles and which join in the aforementioned trough. The ring may be non-resilient. Resilient spacers may be used on either side of the ring and overlap the joint between the two ring pieces to seal the joint. See, for example, FIG. 13 which illustrates the above-mentioned ring and channel but which includes both seals oriented to resist fluid flowing left to right (wherein the seal to the right is a redundancy seal to operate in case the seal to the left fails to seal completely). FIG. 14 shows a series of similar spring energized seal assemblies. A series of hat rings cooperate to help force resilient member or members outward when pressure pushes against the left sides of the hat rings. Retainer 55 is a threaded ring used in various embodiments to keep the spring-energized seal in place.

FIGS. 15A and 15B address wear sleeve options. FIG. 15A shows, in more detail, sleeve 5 of FIG. 3. The threaded end of the sleeve and its interface with the threaded spool projection is more visible than in FIG. 3. FIG. 15B shows a truncated sleeve that amounts to a ring that helps stabilize seal 4.

The following examples pertain to further embodiments.

Example 1. A system (FIG. 3) comprising: a spool (1) coupled to a first flange (20) via a first ring joint gasket (36), the spool including a spool projection (39); a spool housing (2) coupled to a second flange (19) via a second ring joint gasket (35), the spool housing including a third flange (37) and a spool housing channel (38); first and second studs (10) that each: (a) contact the spool, and (b) traverse the third flange to couple the spool to the spool housing; a plurality of nuts comprising: (a) first (8) and second (9) nuts that are coupled to the first stud and that are on opposing sides of the third flange from one another; and (b) third (8) and fourth (9) nuts that are coupled to the second stud and that are on opposing sides of the third flange from one another; wherein the spool projection is slidingly engaged within the spool housing channel.

While this version of Example 1 explicitly includes two instances of stud 10, the example also covers embodiments with three or more instances of stud 10.

While this version of Example 1 includes studs, other means for coupling may be used such as bolts, nails, rods, and the like.

Alternative version of Example 1. A system comprising: a spool (1) to couple to a first flange (20) via a first ring joint gasket (36), the spool including a spool projection (39); a spool housing (2) to couple to a second flange (19) via a second ring joint gasket (35), the spool housing including a third flange (37) and a spool housing channel (38); first and second studs (10) to each: (a) contact the spool, and (b) traverse the third flange to couple the spool to the spool housing; a plurality of nuts comprising: (a) first (8) and second (9) nuts to couple to the first stud on opposing sides of the third flange from one another; and (b) third (8) and fourth (9) nuts to couple to the second stud on opposing sides of the third flange from one another; wherein the spool projection is slidingly engaged within the spool housing channel.

Thus, some embodiments do not include the first and second flanges. However, other embodiments include an entire manifold system. Such a system may include combinations of valves, chokes, spools, and the like. Such a system may be in assembled or disassembled form. In an embodiment, the system includes a choke and the choke includes one of the first or second flanges. In an embodiment, the spool is configured to be downstream of a choke.

Alternative version of Example 1. A system comprising: a spool (1) to couple to a first flange (20) via a first ring joint gasket (36), the spool including a spool projection (39); a spool housing (2) to couple to a second flange (19) via a second ring joint gasket (35), the spool housing including a spool housing channel (38); a third flange (37) on one of the spool or the spool housing; first and second studs (10) to each: (a) contact the spool, and (b) traverse the third flange to couple the spool to the spool housing; a plurality of nuts comprising: (a) first (8) and second (9) nuts to couple to the first stud on opposing sides of the third flange from one another; and (b) third (8) and fourth (9) nuts to couple to the second stud on opposing sides of the third flange from one another; wherein the spool projection is slidingly engaged within the spool housing channel.

Thus, in some embodiments the third flange may be on the spool or the spool housing.

Alternative version of example 1. A system comprising: a spool (1) to couple to a first flange (20) via a first ring joint gasket (36), the spool including a spool portion (39); a spool housing (2) to couple to a second flange (19) via a second ring joint gasket (35), the spool housing including a spool housing channel (38); a third flange (37) on one of the spool or the spool housing; first and second studs (10) to each: (a) contact the spool, and (b) traverse the third flange to couple the spool to the spool housing; a plurality of nuts comprising: (a) first (8) and second (9) nuts to couple to the first stud on opposing sides of the third flange from one another; and (b) third (8) and fourth (9) nuts to couple to the second stud on opposing sides of the third flange from one another; wherein the spool portion is slidingly engaged within the spool housing channel.

Thus, in some embodiments a portion of the spool (versus a projection of the spool) may slide within the spool housing channel. In such an embodiment, the spool need not be graduated and have varying outer diameters in stair step fashion.

Alternative version of example 1. A system comprising: a spool (1) to couple to a first flange (20) via a first coupling, the spool including a spool portion (39); a spool housing (2) to couple to a second flange (19) via a second coupling, the spool housing including a spool housing channel (38); a third flange (37) on one of the spool or the spool housing; first and second studs (10) to each: (a) contact the spool, and (b) traverse the third flange to couple the spool to the spool housing; a plurality of nuts comprising: (a) first (8) and second (9) nuts to couple to the first stud on opposing sides of the third flange from one another; and (b) third (8) and fourth (9) nuts to couple to the second stud on opposing sides of the third flange from one another; wherein the spool portion is slidingly engaged within the spool housing channel.

Thus, not all embodiments are limited to those with ring joint gasket couplings. Other couplers are possible, including those couplings that would prevent a spool from being removed in a direction orthogonal to a long axis of the spool housing channel without first moving adjacent flanges away from the spool. An embodiment includes a method of removing a spool from a manifold without altering a physical location of either of the first or second flanges. As a result, embodiments described herein allow a user to avoid or lessen the delay (which can be a day or more) associated with removing a spool from a manifold. Further, conventionally to remove a spool a user may attempt to move a portion of the manifold away from the spool to create room (i.e., clear the resistance of a ring joint gasket). This may cause a bending moment at some location in the manifold and if repeated, this stress on the manifold may lead to damage to the manifold over time. Methods and system described herein help avoid or lessen this damage.

Another version of example 1. A system (FIG. 3) comprising: a spool (1) coupled to a first conduit (20) via a first ring joint gasket (36), the spool including a spool projection (39); a spool housing (2) coupled to a second conduit (19) via a second ring joint gasket (35), the spool housing including a third flange (37) and a spool housing channel (38); first and second studs (10) that each: (a) contact the spool, and (b) traverse the third flange to couple the spool to the spool housing; a plurality of nuts comprising: (a) first (8) and second (9) nuts that are coupled to the first stud and that are on opposing sides of the third flange from one another; and (b) third (8) and fourth (9) nuts that are coupled to the second stud and that are on opposing sides of the third flange from one another; wherein the spool projection is slidingly engaged within the spool housing channel.

As used herein, flanged or bolted connectors may have different coupling means yet still be forms of conduits. For example, chokes and valves are still forms of conduits as the term "conduit" is used herein.

Example 2. The system of example 1, comprising a first annular void (40), wherein: the spool housing channel (38) includes a first axis (41); a second axis (42), orthogonal to the first axis, intersects the first annular void, the spool projection (39), and the spool housing (2).

Example 3. The system of example 2, wherein: the spool has a spool end (44) that abuts the first flange (20); in a first orientation (FIG. 2A, FIG. 3) the first annual void has a first volume and the third flange is a first distance (43) from the spool end; in a second orientation (FIG. 2B) the first annual void has a second volume and the third flange is a second distance from the spool end; the first volume is more than the second volume and the first distance is more than the second distance.

Embodiments of the spool have a variable length. Thus, there may be a first orientation wherein the spool is at its maximum length and a second orientation where the spool is at its minimum length. However, this does not preclude a third orientation that has a third length that is shorter than the first length but longer than the second length. Further, the spool may be operated under high pressure in this third orientation. Thus, the spool is not limited to a method of moving the spool between the first and second orientations to allow the spool to be removed/inserted from or into a manifold. Instead, the spool may function as a variable length spool that allows flexibility in terms of joining two manifold portions together when the desired distance between the two portions is not known ahead of time or changes (due to reconfiguration of the manifold) or would generally benefit from a spool whose length can be adjusted in "real time" or "on the fly".

Example 3.1 The system of example 3, wherein: screwing the first, second, third, and fourth nuts towards the spool end transitions the system from the first orientation to the second orientation; screwing the first, second, third, and fourth nuts away from the spool end transitions the system from the second orientation to the first orientation.

Example 4. The system according to any of examples 2 to 3.1 comprising a bearing included within the first void.

Example 5. The system of example 4, wherein the bearing is a linear bearing.

Example 6. The system according to any of examples 4 to 5 comprising a bearing housing directly contacting the bearing, wherein: the bearing housing is between the bearing and the spool housing; the second axis intersects the bearing housing; the bearing is slidingly engaged with the bearing housing.

Example 7. The system according to any examples 1 to 6 comprising a sleeve (5), wherein: a third axis (45) intersects the sleeve, the spool projection, and the spool housing; a fourth axis (46) intersects the sleeve and the spool housing but not the spool projection; a fifth axis (47) intersects the spool housing but not the sleeve and not the spool projection.

Example 8. The system according to example 7 comprising a second void (48) between the sleeve and the spool housing, wherein the fourth axis intersects the second void.

Example 9. The system of example 8, wherein the sleeve includes an aperture that directly interfaces the second void and the spool housing channel.

Example 9.1 The system according to any of examples 7 to 9 comprising a wear conduit (3), wherein: the spool includes a spool channel to fluidly couple to the spool housing channel; the wear conduit lines the spool channel.

Example 9.2 The system of example 9.1 wherein the wear conduit is not longer than the spool.

Example 9.3 The system of example 9.1, wherein: the second axis intersects the wear conduit; the fourth axis does not intersect the wear conduit.

Thus, by managing the wear conduit length the spool is left room to slide into the spool housing channel.

Example 10. The system according to any of examples 1 to 9 comprising a seal (4) directly contacting the spool housing and the spool projection, wherein the seal is sliding engaged with a first of the spool housing or spool projection but not a second of the spool housing or spool projection.

For example, in FIG. 3 the seal is statically located in a groove of the spool projection and slides along an inner wall of the spool housing.

Example 11. The system of example 10 comprising a port (14) that interfaces an outer wall of the spool housing, wherein the port is configured to drain liquid that contacts an outer wall of the spool projection.

Example 12. The system of example 2 comprising a third stud to couple the spool to the first flange, wherein: the third stud traverses a first aperture of the spool and a second aperture of the first flange; at least one of the first or second apertures includes non-circular profile in a plane orthogonal to the first axis.

See, for example, FIG. 8.

Another version of example 12. The system of example 2 comprising a third stud to couple the spool to the first flange, wherein: the third stud is to traverse a first aperture of the spool and a second aperture of the first flange; at least one of the first or second apertures includes non-circular profile in a plane orthogonal to the first axis.

Example 21. A system (FIG. 4) comprising: a spool (1B) coupled to a first flange via a first ring joint gasket, the spool including a spool projection; a spool housing (2B) coupled to a second flange via a second ring joint gasket, the spool housing including a spool housing channel; a bearing (16) coupled to the spool housing; and a collar (17) coupled to the bearing 16, wherein the collar is also coupled, via threads, to the spool; wherein the collar is configured to: (a) rotate about the threads in a first direction to shorten the length of the system by driving the spool projection, at least partially, into the spool housing, and (b) rotate about the threads in a second direction to lengthen the length of the system by withdrawing, at least partially, the spool projection from the spool housing channel.

Another version of Example 21. A system (FIG. 18B) comprising: a spool (102) coupled to a first flange via a first ring joint gasket, the spool including a spool projection; a spool housing (101) coupled to a second flange via a second ring joint gasket, the spool housing including a spool housing channel; a bearing (143) coupled to the spool housing; and a collar (104) coupled to the bearing, wherein the collar is also coupled, via threads, to the spool; wherein the collar is configured to: (a) rotate about the threads in a first direction to shorten the length of the system by driving the spool projection, at least partially, into the spool housing, and (b) rotate about the threads in a second direction to lengthen the length of the system by withdrawing, at least partially, the spool projection from the spool housing channel.

Bearing 143 may refer to any bearing surface adjacent void 141.

Example 22. The system of example 21 comprising: a retaining ring: (a) slidingly coupled to the collar, and (b) statically coupled to the spool housing; wherein the retaining ring is configured to retain the collar and prevent the collar from separating from the bearing.

Figure 18A:
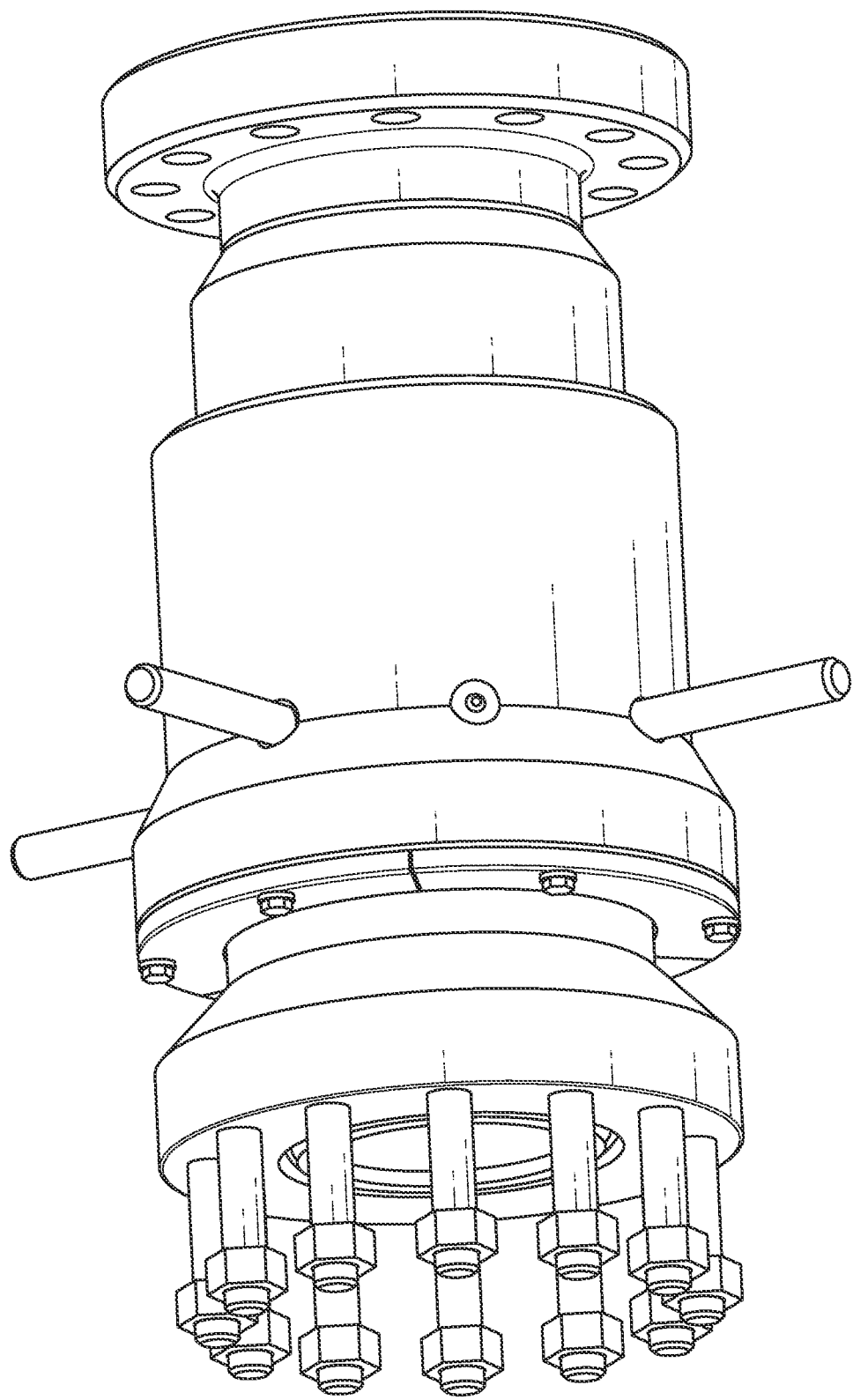
FIG. 18A provides a perspective view of an embodiment a sliding spool.
Figure 18B:
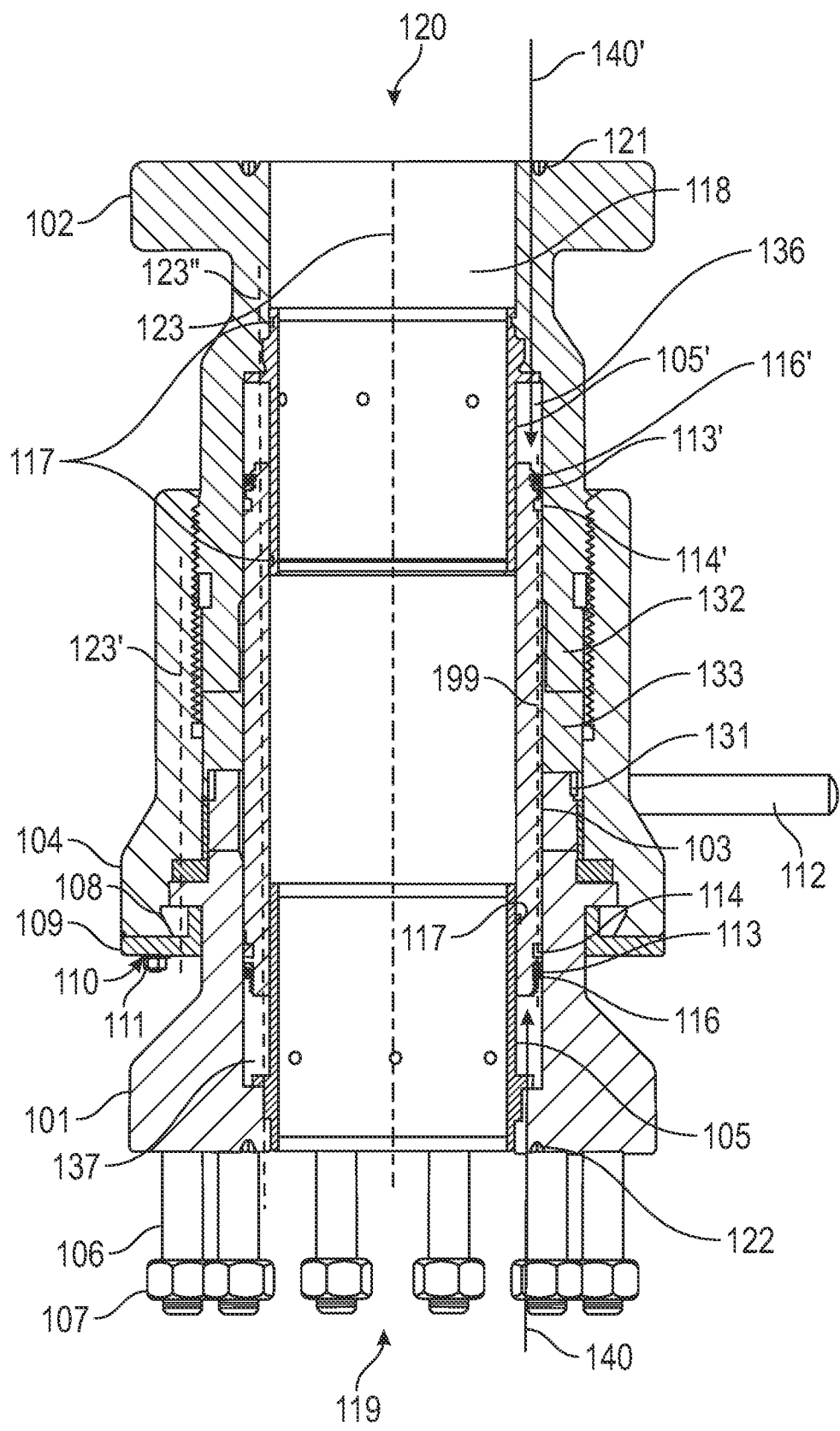
FIGS. 18B and 18C provide cross-section views of the embodiment.
Figure 18C:
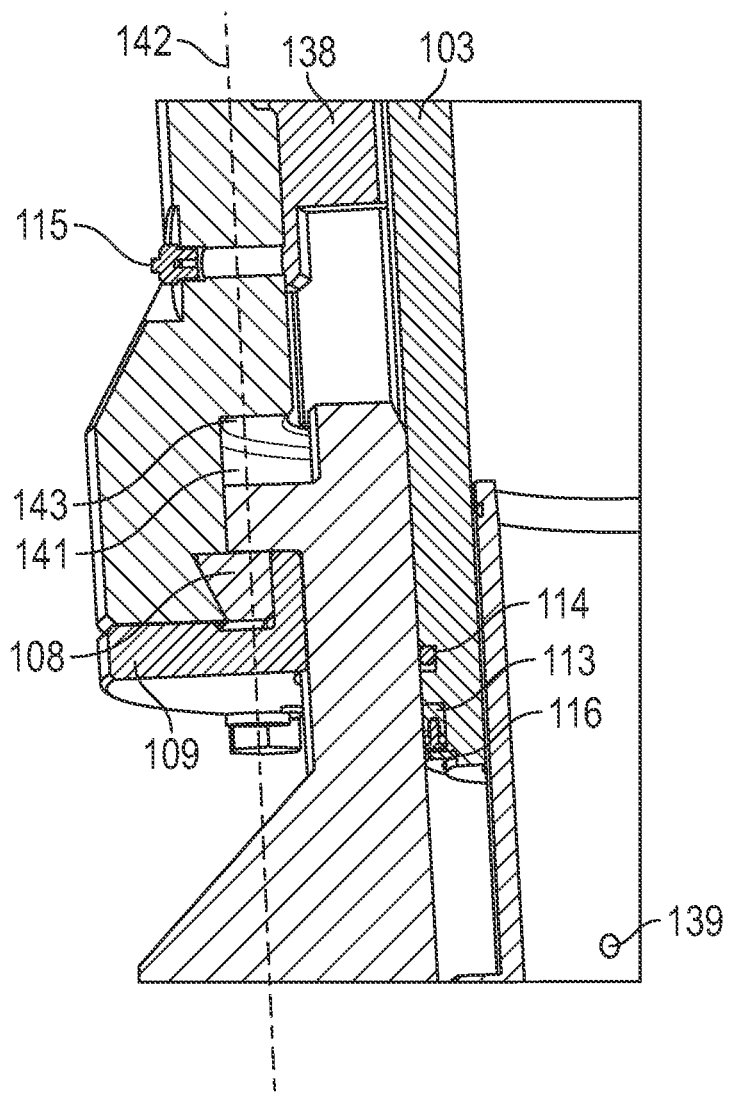
Figure 18D:
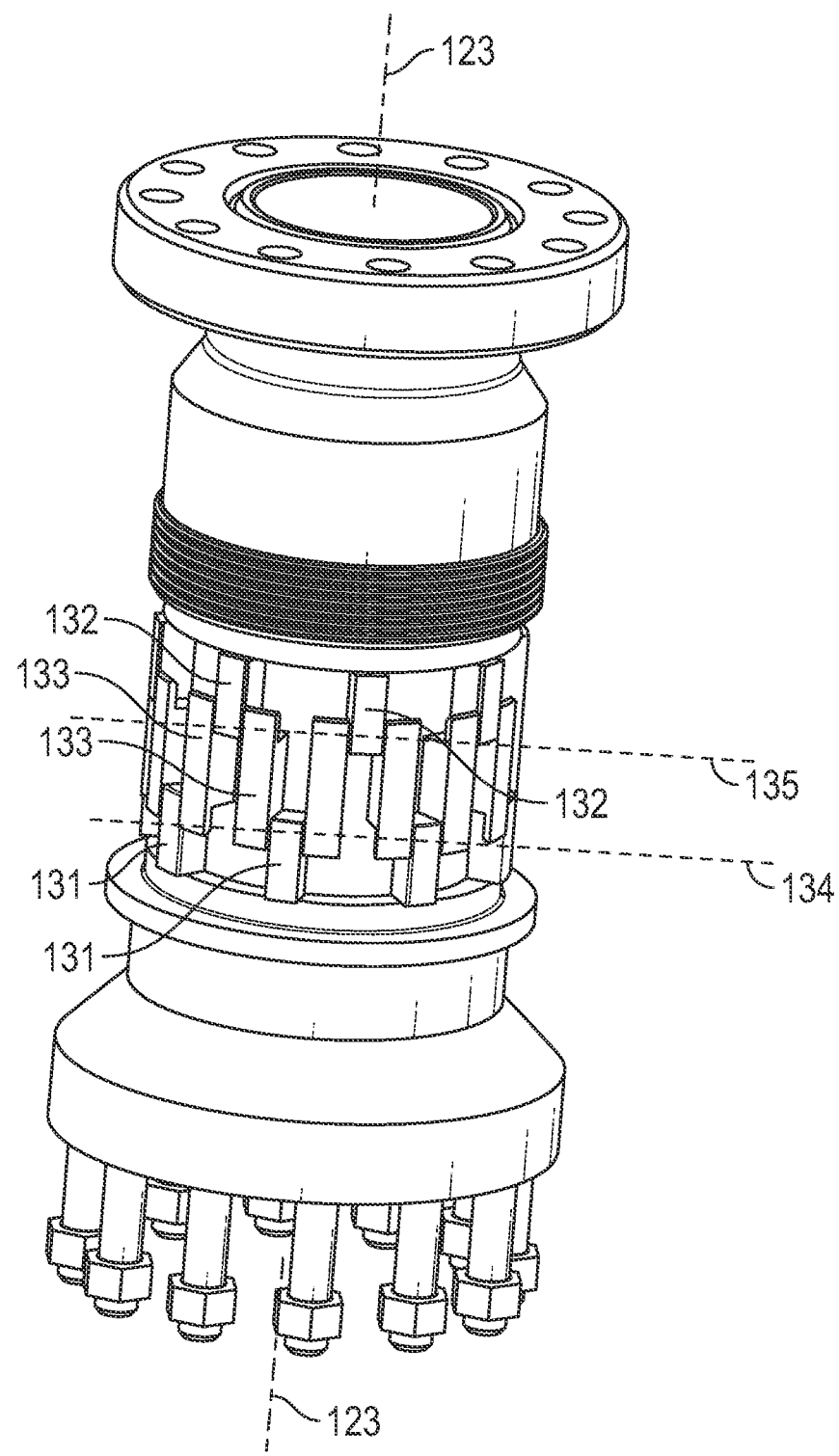
FIG. 18D provide perspective view of the embodiment without an outer conduit in place.

For example, see element 108 of FIG. 18C.

Example 23. The system of example 22, wherein the collar is coupled to a handle and the handle is configured to aid rotating the collar about the threads.

For example, see element 112 of FIG. 18B.

Example 24. The system according to any of examples 21 to 23, comprising an annular void, wherein: the spool housing channel includes a first axis; a second axis, orthogonal to the first axis, intersects the annular void, the spool projection, and the collar.

This may occur in, for example, void 136 of FIG. 18B depending on the amount of overlap between conduits 102, 104.

Example 25. The system of example 24, wherein: the spool has a spool end that abuts the first flange; in a first orientation the annual void has a first volume and the collar is a first distance from the spool end; in a second orientation the annual void has a second volume and the collar is a second distance from the spool end; the first volume is more than the second volume and the first distance is more than the second distance.

Example 26. The system of example 25, wherein: rotating the collar about the threads in the first direction transitions the system from the first orientation to the second orientation; rotating the collar about the threads in the second direction transitions the system from the second orientation to the first orientation.

Example 27. The system according to any examples 24 to 26, wherein a third axis intersects the bearing, the collar, the spool projection, and the spool housing and the third axis is orthogonal to the first axis.

Example 28. The system according to any of examples 21 to 27 comprising a seal directly contacting the spool housing and directly contacting the spool projection, wherein the seal is sliding engaged with a first of the spool housing or spool projection but not a second of the spool housing or spool projection.

Example 31. A system (FIG. 6) comprising: a spool (1C) coupled to a first flange via a first ring joint gasket, the spool including a spool projection; a spool housing (2C) coupled to a second flange via a second ring joint gasket, the spool housing including a third flange and a spool housing channel; first and second studs (10A) that each: (a) contact the spool, and (b) traverse the third flange to couple the spool to the spool housing; a plurality of nuts comprising: (a) first and second nuts that are coupled to the first stud and that are on opposing sides of the third flange from one another; and (b) third and fourth nuts that are coupled to the second stud and that are on opposing sides of the third flange from one another; wherein the spool projection is slidingly engaged within the spool housing channel.

Alternative version of example 31. A system comprising: a spool to couple to a first flange via a first ring joint gasket, the spool including a spool projection; a spool housing to couple to a second flange via a second ring joint gasket, the spool housing including a third flange and a spool housing channel; first and second studs to each: (a) contact the spool, and (b) traverse the third flange to couple the spool to the spool housing; a plurality of nuts comprising: (a) first and second nuts to couple to the first stud on opposing sides of the third flange from one another; and (b) third and fourth nuts to couple to the second stud on opposing sides of the third flange from one another; wherein the spool projection is slidingly engaged within the spool housing channel.

Thus, some embodiments do not include the first and second flanges.

Alternative version of example 31. A system comprising: a spool to couple to a first flange via a first ring joint gasket, the spool including a spool projection; a spool housing to couple to a second flange via a second ring joint gasket, the spool housing including a spool housing channel; a third flange on one of the spool or the spool housing; first and second studs to each: (a) contact the spool, and (b) traverse the third flange to couple the spool to the spool housing; a plurality of nuts comprising: (a) first and second nuts to couple to the first stud on opposing sides of the third flange from one another; and (b) third and fourth nuts to couple to the second stud on opposing sides of the third flange from one another; wherein the spool projection is slidingly engaged within the spool housing channel.

Thus, in some embodiments the third flange may be on the spool or the spool housing.

Alternative version of example 31. A system comprising: a spool to couple to a first flange via a first ring joint gasket, the spool including a spool portion; a spool housing to couple to a second flange via a second ring joint gasket, the spool housing including a spool housing channel; a third flange on one of the spool or the spool housing; first and second studs to each: (a) contact the spool, and (b) traverse the third flange to couple the spool to the spool housing; a plurality of nuts comprising: (a) first and second nuts to couple to the first stud on opposing sides of the third flange from one another; and (b) third and fourth nuts to couple to the second stud on opposing sides of the third flange from one another; wherein the spool portion is slidingly engaged within the spool housing channel.

Thus, in some embodiments a portion of the spool (versus a projection of the spool) may slide within the spool housing channel. In such an embodiment, the spool need not be graduated and have varying outer diameters in stair step fashion.

Example 32. The system of example 31, comprising a first annular void, wherein: the spool housing channel includes a first axis; a second axis, orthogonal to the first axis, intersects the first annular void, the spool projection, and the spool housing.

The first void may be void 40C of FIG. 6 but may also be voids such as void 40C'.

Example 33. The system of example 32, wherein: the spool has a spool end that abuts the first flange; in a first orientation the first annual void has a first volume and the third flange is a first distance from the spool end; in a second orientation the first annual void has a second volume and the third flange is a second distance from the spool end; the first volume is more than the second volume and the first distance is more than the second distance.

Example 33.1 The system of example 33 comprising a port coupled to a fluid source, wherein: passing fluid through the port via a first direction transitions the system from the first orientation to the second orientation; passing fluid through the port via a second direction transitions the system from the second orientation to the first orientation.

For example, a system may have a hydraulic port or may include multiple ports as is the case in FIG. 6.

Example 34. The system according to any of examples 32 to 33.1 comprising a piston that interfaces the first void.

Example 35. The system according to example 32 comprising a second void between the spool projection and the spool housing, wherein a third axis (which is parallel to the second axis) intersects the second void.

Example 36. The system according to any of examples 31 to 35 comprising a seal directly contacting the spool housing and the spool projection, wherein the seal is sliding engaged with a first of the spool housing or spool projection but not a second of the spool housing or spool projection.

While in many instances herein spool embodiments are affiliated with manifold systems, embodiments are not so limited and may function in more general capacities such as, for example, to couple pieces of equipment together, such as two conduits.

Example 1a. A spool (FIG. 18A-18D) for oilfield manifolds, the spool comprising: a first conduit (101) to couple to a first flange via a first ring joint gasket (122); a second conduit (102) to couple to a second flange via a second ring joint gasket (121), the second conduit including threads; a third conduit (103) coupled to the first and second conduits; a fourth conduit (104) including threads, the threads of the fourth conduit directly engaging the threads of the second conduit; wherein the first, second, and third conduits collectively form a channel that (118) couples first and second opposing ends (119, 120) of the spool to one another and which includes a long axis (123); wherein (a) rotating the fourth conduit about the long axis in a first rotational direction moves the second conduit linearly along the long axis in a first linear direction; (b) rotating the fourth conduit about the long axis in a second rotational direction moves the second conduit linearly along the long axis in a second linear direction; and (c) the first and second rotational directions are opposite of each other and the first and second linear directions are opposite of each other.

For instance, the first rotational direction may be "clockwise" and the first linear direction may be towards end 120. This may occur during installation when the spool is being expanded. The second rotational direction may be "counter clockwise" and the second linear direction may be towards end 119. This may occur during disassembly when the spool is being collapsed.

The embodiment of FIG. 18A may be used in a vertical orientation whereby a portion of the manifold is above the spool and a portion of the manifold weight is supported by the slidable spool. The threaded portions of the second and third conduit help better support the load above the spool than embodiments, such as those found in FIG. 3 (which rely on bolt 10 for support). In other words, the embodiment of FIG. 18A may be better able to support loads located vertically above the spool than other embodiments.

Alternative version of claim 1a. A spool (FIG. 18A-18D) for oilfield manifolds, the spool comprising: a first conduit (101) coupled to a first flange via a first ring joint gasket (122); a second conduit (102) coupled to a second flange via a second ring joint gasket (121), the second conduit including threads; a third conduit (103) coupled to the first and second conduits; a fourth conduit (104) including threads, the threads of the fourth conduit directly engaging the threads of the second conduit; wherein the first, second, and third conduits collectively form a channel that (118) couples first and second opposing ends (119, 120) of the spool to one another and which includes a long axis (123); wherein (a) rotating the fourth conduit about the long axis in a first rotational direction moves the second conduit linearly along the long axis in a first linear direction; (b) rotating the fourth conduit about the long axis in a second rotational direction moves the second conduit linearly along the long axis in a second linear direction; and (c) the first and second rotational directions are opposite of each other and the first and second linear directions are opposite of each other.

Thus, in some embodiments the spool is already coupled within a manifold.

Alternative version of example 1a. A spool (FIG. 18A-18D) for oilfield manifolds, the spool comprising: a first conduit (101) to couple to a first flange; a second conduit (102) to couple to a second flange, the second conduit including threads; a third conduit (103) coupled to the first and second conduits; a fourth conduit (104) including threads, the threads of the fourth conduit directly engaging the threads of the second conduit; wherein the first, second, and third conduits collectively form a channel that (118) couples first and second opposing ends (119, 120) of the spool to one another and which includes a long axis (123); wherein (a) rotating the fourth conduit about the long axis in a first rotational direction moves the second conduit linearly along the long axis in a first linear direction; (b) rotating the fourth conduit about the long axis in a second rotational direction moves the second conduit linearly along the long axis in a second linear direction; and (c) the first and second rotational directions are opposite of each other and the first and second linear directions are opposite of each other.

Thus, as mentioned above, not all embodiments require ring joint gaskets.

Example 2a. The spool of example 1a, wherein: moving the second conduit in the first linear direction and into a first orientation decreases an overall length of the spool and moving the second conduit in the second linear direction and into a second orientation increases the overall length of the spool; the overall length of the spool is measured parallel to the long axis and from the first end of the spool to the second end of the spool.

Example 3a. The spool according to any of examples 1a-2a, wherein: the first conduit has a first plurality of bars (131); the second conduit has a second plurality of bars (132); the third conduit has a third plurality of bars (133); in the first orientation, a first plane intersects the first and third pluralities of bars; in the second orientation, a second plane intersects the second and third pluralities of bars; the first and second planes are both orthogonal to the long axis.

The bars (fingers) help to guide the third conduit (sometimes referred to as a "floating seat") when it slides within the first and second conduits. Further, the bars act as a re-enforcement for the floating seat. In other words, the floating seat is prevented from rotating about an axis that is orthogonal to the long axis due to the presence of fingers for the first or second conduits. In addition, the bars enable the first conduit (sometime referred to as an "inlet adapter") and second conduit (sometimes referred to as an outlet adapter) to re-orient in multiple bolt hole orientation (i.e., so the spool can interface the first and/or second flanges in various ways without requiring an overly precise alignment of, for example, bolts 106 to the first flange).

Example 4a. The spool of example 3a comprising a valve (115) fluidly coupling an exterior of the spool to a void (138) that is interior to the spool and which interfaces at least one of the first plurality of bars and at least one of the third plurality of bars.

Valve 115 may function as a relief valve that will release the pressure in void 138 in the event of seal failure (e.g., failure of seal 113).

Example 5a. The spool according to any of examples 1a-4a comprising a fifth conduit (105) that is at least partially included in each of the first and third conduits.

Conduit 105 (also referred to as a "trash sleeve") prevents trash from entering the cavity 137 and thereby enables third conduit 103 to "float" freely inside cavity 137.

Example 6a. The spool of example 5, wherein the fifth conduit includes a side wall that perforated with a plurality of apertures (139).

The fifth conduit may include a "trash sleeve" to filter debris from fluid in channel 118 before the fluid enters void 136, 137 via aperture 139.

Example 7a. The spool according to any of examples 1a-6a comprising a sixth conduit (105') that is at least partially included in each of the second and third conduits.

Example 8a. The spool according to any of examples 1a-7a comprising a plurality of studs (106) and nuts (107) to couple the second end to the second flange.

Example 9a. The spool according to any of example 1a-8a comprising a ring, wherein: the ring (108) has first and second opposing ends that do not contact each other when the ring is in a relaxed state; the first conduit couples to the fourth conduit via the ring.

Ring 108 may include a splitable lock ring. Instead of coupling the first and fourth conduits to each other using flanges and bolts, the lock ring couples the conduits to each other using a smaller "foot print". Further, the ring requires less effort for assembly and disassembly as compared to traditional bolt type connections. The ring may be split and include some resiliency to help install the ring over shoulders and the like.

Example 10a. The spool of example 9a, wherein an additional axis (123') is parallel to the long axis and intersects the first conduit, the third conduit, and the ring.

Example 11a. The spool according to any of examples 1a-10a comprising a plurality of handles (112) that extend radially outwards from the fourth conduit, wherein the plurality of handles is configured to assist a user in rotating the fourth conduit about the long axis.

In an embodiment, the system may be driven by other means other than by manually using handle or handles 112 to rotate conduit 104. For example, hydraulic systems and the like may be employed to advance the first and/or second conduit along the long axis.

Example 12a. The spool according to any of examples 1a-11a, wherein: rotating the fourth conduit about the long axis in the first rotational direction does not move any of the first, third, or fourth conduit linearly along the long axis; rotating the fourth conduit about the long axis in the second rotational direction does not move any of the first, third, or fourth conduits linearly along the long axis.

Example 13a. The spool according to any of examples 1a-9a comprising a first annular void (136), wherein an additional axis (123") is parallel to the axis and intersects the second conduit, the third conduit, and the first annular void.

Void 136 provides a space within which the second conduit receives the third conduit in vary degrees depending on how expanded/contracted the slide spool is.

Example 14a. The spool of example 13a, wherein: when the spool is in an expanded orientation the first annual void has a first volume; when the spool is in a compressed orientation the first annual void has a second volume; the first volume is greater than the second volume.

As mentioned above, there may be intermediate orientations between fully compressed and fully expanded orientations thereby allowing a user to operate the spool in varying lengths to better accommodate manifolds or piping with differing distances between components the spool couples.

Example 15a. The spool of example 14a comprising a second annular void (137), wherein the additional axis intersects the first conduit and the second annular void.

Example 16a. The spool of example 15a comprising first (113) and second (113') seals, wherein: the first seal is between the first and third conduits and is configured to resist fluid flowing towards the second end of the spool more so than fluid flowing towards the first end of the spool; the second seal is between the second and third conduits and is configured to resist fluid flowing towards the first end of the spool more so than fluid flowing towards the second end of the spool.

Similar to FIG. 12, the first seal of FIG. 18B may be unidirectional and include components analogous to ring 51, resilient member 52, casing 53, ring 55, wall portion 54 of FIG. 12 and function in a similar manner.

Example 17a. The spool of example 16a, wherein the first and second seals are both unidirectional seals.

A unidirectional seal, to a person of ordinary skill, means the seal is primarily configured to prevent or resist flow in a single direction.

Example 18a. The spool of example 16a, wherein the additional axis intersects the first and second seals.

This is not shown in FIG. 18B for purposes of clarity. However, axis 123" could be moved to the left in the figure and intersect the seals.

With voids on both upstream and downstream sides of conduit 103, opposing pressures cancel one another. For example, fluid may enter voids 136, 137, via perforations 139 in trash sleeves/conduits 105, 105', creating pressures 140, 140'. Those pressures cancel or work against each other. As a result, conduit 102 is not forced (or is forced to a lesser extent), for example, towards end 120. This avoids or lessens any moment that may be exerted against the manifold or piping to which the spool is coupled. Lessening the moment/force exerted against manifold components helps potentially lessen damage to such components over time.

In contrast, note how in FIG. 10 the forces are not cancelled and a moment is, as a result, exerted on the manifold. While components 8, 9, 10 of the embodiment of FIG. 10 may counteract the pressure loading, this may still allow a greater moment to be exerted onto the manifold than is the case with FIG. 18A.

Further, the opposing forces 140, 140' do not act to separate conduits 101, 102 from one another. This is in contrast to the embodiment of FIG. 10. During operation of the spool, forcing conduits 101, 102 away from each other may be undesirable and lead to poor spool performance (e.g., leaks).

Also, the canceling forces 140, 140' allow space savings by allowing for use of splitable lock ring 108 instead of a more traditional flange/bolt assembly (which may have been required with unbalanced forces possibly pulling the first and fourth conduits away from each other).

Example 19a. The spool of example 16a comprising: an additional first seal (114) between the first and third conduits; an additional second seal (114') is between the second and third conduits; a first ring (116) between the first and third conduits; a second ring (116') between the first and third conduits; wherein first seal is between the first ring and the additional first seal and the second seal is between the second ring and the additional second seal.

The embodiment of FIG. 18B may include other components, such as seals (e.g., O-rings) 117, lock ring 109, slit lock washer 110, bolt 111. Bolt 111 fixes ring 109 to conduit 104, and ring 109 rotates along with conduit 104 when conduit 104 is being rotated to shorten or expand the spool.

Seals 117 help avoid metal contact of conduits 105, 105' with conduit 103 (to better allow conduit to "float" or freely slide within the spool. Seals 117 may also act a "wiper seal" when compressing and expanding the spool. In other words, seals 117 prevent contaminants from entering spaces (e.g., voids 136, 137). Such seals maintain sealing contact to conduit 103 when the spool is not expanding or contracting and when the spool is expanding or contracting.

Example 20a. The spool according to any of examples 1a-19a wherein the second conduit is slidingly engaged with the third conduit and the second conduit is configured to slide across the third conduit in response to rotation of the fourth conduit about the long axis.

Example 21a. The spool of example 20a wherein the first conduit is slidingly engaged with the third conduit.

For instance, conduit 103 may be referred to as a "floating seat" considering it slides freely along inner walls of conduits 101, 102. As a result, the floating seat is enables pressure equalization within voids 136, 137 (i.e., allows pressures 140, 140' to cancel each other). In contrast, if conduit 103 were to be fixedly coupled to, for example, conduit 101, that may result in uneven pressure that forces conduit 102 towards its flange thereby generating an unwanted moment on equipment coupled to the flange.

Example 22a. The spool of example 21a wherein the third conduit is slidingly engaged within the spool and is configured to slide both towards and away from the first end of the spool and both towards and away from the second end of the spool.

Example 23a. The spool according to any of examples 1a-22a comprising a void (141) between the first and fourth conduits, wherein a supplemental axis (142) is parallel to the long axis and intersects the first conduit, the fourth conduit, and the void that is between the first and fourth conduits.

When a spool is added into a system, such as a manifold system, the spool may be oriented vertically with end 120 located directly above end 119. Before conduit 102 is coupled to its mating flange, the sheer weight of conduit 102 may force it (as well as conduit 104) to slide move downwards thereby diminishing or negating void 141. Void 141 may still be non-existent even after conduit 104 advances conduit 102 to interface the flange along end 120. However, when end 120 is forcibly attached to its flange (via stud/bolts) to compress seal 121, the combination of conduits 102, 104 may move towards the flange thereby increasing the size of void 141. In other words, void 141 allows for spool to form a tighter and more secure seal against the flange that mates with end 120.

Further, as a result, conduit 104 is slidingly coupled to conduit 101 along a vertical path. In other words, conduit 104 rotates about conduit 101 but also slides vertically with regard to conduit 101.

Example 24a. The spool according to example 23a, wherein the fourth conduit is slidingly coupled to the first conduit along a path that is parallel to the long axis.

Example 25a. The spool according to example 23a, comprising a bearing surface (143) that sliding couples the first and fourth conduits to another.

Alternative version of example 1a. A spool (FIG. 18A-18D) for oilfield manifolds, the spool comprising: a first conduit (101) to couple to a first flange via a first ring joint gasket (122); a second conduit (102) to couple to a second flange via a second ring joint gasket (121), the second conduit including threads; a third conduit (104) including threads, the threads of the third conduit directly engaging the threads of the second conduit; wherein the first and second conduits collectively form a channel that (118) couples first and second opposing ends (119, 120) of the spool to one another and which includes a long axis (123); wherein (a) rotating the third conduit about the long axis in a first rotational direction moves the second conduit linearly along the long axis in a first linear direction; (b) rotating the third conduit about the long axis in a second rotational direction moves the second conduit linearly along the long axis in a second linear direction; and (c) the first and second rotational directions are opposite of each other and the first and second linear directions are opposite of each other.

Thus, not all embodiments necessarily require floating seat 103, although there are many advantages described herein for including floating seat 103.

Example 1b. A spool for oilfield manifolds, the spool comprising: a first conduit to couple to a first flange via a first ring joint gasket; a second conduit to couple to a second flange via a second ring joint gasket, the second conduit including threads; a third conduit coupled to the first and second conduits; a fourth conduit including threads, the threads of the fourth conduit directly engaging the threads of the second conduit; wherein the first, second, and third conduits collectively form a channel that couples first and second opposing ends of the spool to one another and which includes a long axis; wherein (a) rotating the fourth conduit about the long axis in a first rotational direction moves the second conduit linearly along the long axis in a first linear direction; (b) rotating the fourth conduit about the long axis in a second rotational direction moves the second conduit linearly along the long axis in a second linear direction; and (c) the first and second rotational directions are opposite of each other and the first and second linear directions are opposite of each other.

Example 2b. The spool of example 1b, wherein: moving the second conduit in the first linear direction and into a first orientation decreases an overall length of the spool and moving the second conduit in the second linear direction and into a second orientation increases the overall length of the spool; the overall length of the spool is measured parallel to the long axis and from the first end of the spool to the second end of the spool.

Example 3b. The spool of example 2b, wherein: the first conduit has a first plurality of bars; the second conduit has a second plurality of bars; the third conduit has a third plurality of bars; in the first orientation, a first plane intersects the first and third pluralities of bars; in the second orientation, a second plane intersects the second and third pluralities of bars; the first and second planes are both orthogonal to the long axis.

Example 4b. The spool of example 3b comprising a valve fluidly coupling an exterior of the spool to a void that is interior to the spool and which interfaces at least one of the first plurality of bars and at least one of the third plurality of bars.

Example 5b. The spool of example 1b comprising a fifth conduit that is at least partially included in each of the first and third conduits.

Example 6b. The spool of example 5b, wherein the fifth conduit includes a side wall that perforated with a plurality of apertures.

Example 7b. The spool of example 5b comprising a sixth conduit that is at least partially included in each of the second and third conduits.

Example 8b. The spool of example 1b comprising a plurality of studs and nuts to couple the second end to the second flange.

Example 9b. The spool of example 1b comprising a ring, wherein: the ring has first and second opposing ends that do not contact each other when the ring is in a relaxed state; the first conduit couples to the fourth conduit via the ring.

Example 10b. The spool of example 9b, wherein an additional axis is parallel to the long axis and intersects the first conduit, the third conduit, and the ring.

Example 11b. The spool of example 1b comprising a plurality of handles that extend radially outwards from the fourth conduit, wherein the plurality of handles is configured to assist a user in rotating the fourth conduit about the long axis.

Example 12b. The spool of example 1b, wherein: rotating the fourth conduit about the long axis in the first rotational direction does not move any of the first, third, or fourth conduits linearly along the long axis; rotating the fourth conduit about the long axis in the second rotational direction does not move any of the first, third, or fourth conduits linearly along the long axis.

Example 13b. The spool of example 1b comprising a first annular void, wherein an additional axis is parallel to the axis and intersects the second conduit, the third conduit, and the first annular void.

Example 14b. The spool of example 13b, wherein: when the spool is in an expanded orientation the first annual void has a first volume; when the spool is in a compressed orientation the first annual void has a second volume; the first volume is greater than the second volume.

Example 15b. The spool of example 14b comprising a second annular void, wherein the additional axis intersects the first conduit and the second annular void.

Example 16b. The spool of example 15b comprising first and second seals, wherein: the first seal is between the first and third conduits and is configured to resist fluid flowing towards the second end of the spool more so than fluid flowing towards the first end of the spool; the second seal is between the second and third conduits and is configured to resist fluid flowing towards the first end of the spool more so than fluid flowing towards the second end of the spool.

Example 17b. The spool of example 16b, wherein the first and second seals are both unidirectional seals.

Example 18b. The spool of example 16b, wherein the additional axis intersects the first and second seals.

Example 19b. The spool of example 16b comprising: an additional first seal between the first and third conduits; an additional second seal is between the second and third conduits; a first ring between the first and third conduits; a second ring between the first and third conduits; wherein first seal is between the first ring and the additional first seal and the second seal is between the second ring and the additional second seal.

Example 20b. The spool of example 1b wherein the second conduit is slidingly engaged with the third conduit and the second conduit is configured to slide across the third conduit in response to rotation of the fourth conduit about the long axis.

Example 21b. The spool of example 20b wherein the first conduit is slidingly engaged with the third conduit.

Example 22b. The spool of example 21b wherein the third conduit is slidingly engaged within the spool and is configured to slide both towards and away from the first end of the spool and both towards and away from the second end of the spool.

Example 23b. The spool of example 1b comprising a void between the first and fourth conduits, wherein a supplemental axis is parallel to the long axis and intersects the first conduit, the fourth conduit, and the void that is between the first and fourth conduits.

Example 24b. The spool according to example 23b, wherein the fourth conduit is slidingly coupled to the first conduit along a path that is parallel to the long axis.

Example 25b. The spool according to example 23b, comprising a bearing surface that sliding couples the first and fourth conduits to another.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation wherein a side of a substrate is the "top" surface of that substrate; the substrate may actually be in any orientation so that a "top" side of a substrate may be lower than the "bottom" side in a standard terrestrial frame of reference and still fall within the meaning of the term "top." The term "on" as used herein (including in the claims) does not indicate that a first layer "on" a second layer is directly on and in immediate contact with the second layer unless such is specifically stated; there may be a third layer or other structure between the first layer and the second layer on the first layer. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A spool for oilfield manifolds, the spool comprising:
a first conduit to couple to a first flange via a first ring joint gasket;
a second conduit to couple to a second flange via a second ring joint gasket, the second conduit including threads;
a third conduit coupled to the first and second conduits;
a fourth conduit including threads, the threads of the fourth conduit directly engaging the threads of the second conduit;
wherein the first, second, and third conduits collectively form a channel that couples first and second opposing ends of the spool to one another and which includes an axis;
wherein (a) rotating the fourth conduit about the axis in a first rotational direction moves the second conduit linearly along the axis in a first linear direction; (b) rotating the fourth conduit about the axis in a second rotational direction moves the second conduit linearly along the axis in a second linear direction; and (c) the first and second rotational directions are opposite of each other and the first and second linear directions are opposite of each other.

2. The spool of claim 1, wherein:
moving the second conduit in the first linear direction and into a first orientation decreases an overall length of the spool and moving the second conduit in the second linear direction and into a second orientation increases the overall length of the spool;
the overall length of the spool is measured parallel to the axis and from a first end of the spool to a second end of the spool.

3. The spool of claim 2, wherein:
the first conduit has a first plurality of bars;
the second conduit has a second plurality of bars;
the third conduit has a third plurality of bars;
in the first orientation, a first plane intersects the first and third pluralities of bars;
in the second orientation, a second plane intersects the second and third pluralities of bars;
the first and second planes are both orthogonal to the axis.

4. The spool of claim 3 comprising a valve fluidly coupling an exterior of the spool to a void that is interior to the spool and which interfaces at least one of the first plurality of bars and at least one of the third plurality of bars.

5. The spool of claim 1 comprising a fifth conduit that is at least partially included in each of the first and third conduits.

6. The spool of claim 5, wherein the fifth conduit includes a side wall that is perforated with a plurality of apertures.

7. The spool of claim 5 comprising a sixth conduit that is at least partially included in each of the second and third conduits.

8. The spool of claim 2 comprising a plurality of studs and nuts to couple the second end of the spool to the second flange.

9. The spool of claim 1 comprising a ring, wherein:
the ring has first and second opposing ends that do not contact each other when the ring is in a relaxed state;
the first conduit couples to the fourth conduit via the ring.

10. The spool of claim 9, wherein an additional axis is parallel to the axis and intersects the first conduit, the fourth conduit, and the ring.

11. The spool of claim 1 comprising a plurality of handles that extend radially outwards from the fourth conduit, wherein the plurality of handles is configured to assist a user in rotating the fourth conduit about the axis.

12. The spool of claim 1, wherein:
rotating the fourth conduit about the axis in the first rotational direction does not move any of the first, third, or fourth conduits linearly along the axis;

rotating the fourth conduit about the axis in the second rotational direction does not move any of the first, third, or fourth conduits linearly along the axis.

13. The spool of claim 1 comprising a first annular void, wherein an additional axis is parallel to the axis and intersects the second conduit, the third conduit, and the first annular void.

14. The spool of claim 13, wherein:
when the spool is in an expanded orientation the first annular annual void has a first volume;
when the spool is in a compressed orientation the first annular annual void has a second volume;
the first volume is greater than the second volume.

15. The spool of claim 14 comprising a second annular void, wherein the additional axis intersects the first conduit and the second annular void.

16. The spool of claim 15 comprising first and second seals, wherein:
the first seal is between the first and third conduits and is configured to resist fluid flowing towards a second end of the spool more so than fluid flowing towards a first end of the spool;
the second seal is between the second and third conduits and is configured to resist fluid flowing towards the first end of the spool more so than fluid flowing towards the second end of the spool.

17. The spool of claim 16, wherein the first and second seals are both unidirectional seals.

18. The spool of claim 16, wherein the additional axis intersects the first and second seals.

19. The spool of claim 16 comprising:
an additional first seal between the first and third conduits;
an additional second seal is between the second and third conduits;
a first ring between the first and third conduits;
a second ring between the first and third conduits;
wherein the first seal is between the first ring and the additional first seal and the second seal is between the second ring and the additional second seal.

20. The spool of claim 1 wherein the second conduit is slidingly engaged with the third conduit and the second conduit is configured to slide across the third conduit in response to rotation of the fourth conduit about the axis.

21. The spool of claim 20 wherein the first conduit is slidingly engaged with the third conduit.

22. The spool of claim 21 wherein the third conduit is slidingly engaged within the spool and is configured to slide both towards and away from a first end of the spool and both towards and away from a second end of the spool.

23. The spool of claim 1 comprising a void between the first and fourth conduits, wherein a supplemental axis is parallel to the axis and intersects the first conduit, the fourth conduit, and the void.

24. The spool according to claim 23, wherein the fourth conduit is slidingly coupled to the first conduit along a path that is parallel to the axis.

25. The spool according to claim 23, comprising a bearing surface that slidingly couples the first and fourth conduits to another.

* * * * *

UNITED STATES PATENT AND TRADEMARK OFFICE
CERTIFICATE OF CORRECTION

Page 1 of 1

PATENT NO. : 11,920,705 B2
APPLICATION NO. : 18/307903
DATED : March 5, 2024
INVENTOR(S) : Alagarsamy Sundararajan It is certified that error appears in the above-identified patent and that said Letters Patent is hereby corrected as shown below:

In the Claims

Column 21, Line 11, In Claim 14, "annular annual" should be --annular--;
Column 21, Line 13, In Claim 14, "annular annual" should be --annular--.

Signed and Sealed this
Second Day of April, 2024

Katherine Kelly Vidal
*Director of the United States Patent and Trademark Office*